United States Patent
Wu et al.

(10) Patent No.: US 12,136,817 B2
(45) Date of Patent: Nov. 5, 2024

(54) METHOD OF ACCESSING DYNAMIC FLEXIBILITY FOR VIRTUAL POWER PLANT

(71) Applicant: TSINGHUA UNIVERSITY, Beijing (CN)

(72) Inventors: Wenchuan Wu, Beijing (CN); Siyuan Wang, Beijing (CN); Hongbin Sun, Beijing (CN); Bin Wang, Beijing (CN); Qinglai Guo, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 342 days.

(21) Appl. No.: 17/446,642

(22) Filed: Sep. 1, 2021

(65) Prior Publication Data
US 2022/0173593 A1    Jun. 2, 2022

(30) Foreign Application Priority Data

Nov. 25, 2020 (CN) .......................... 202011341035.3

(51) Int. Cl.
*H02J 3/28* (2006.01)
*G06F 17/11* (2006.01)
*H02J 3/38* (2006.01)

(52) U.S. Cl.
CPC ............... *H02J 3/28* (2013.01); *G06F 17/11* (2013.01); *H02J 3/381* (2013.01); *H02J 2300/24* (2020.01); *H02J 2300/28* (2020.01)

(58) Field of Classification Search
CPC .......... H02J 3/28; H02J 3/381; H02J 2300/24; H02J 2300/28; H02J 2203/20; H02J 3/48; H02J 3/50; H02J 2300/22; G06F 17/11
See application file for complete search history.

(56) References Cited

U.S. PATENT DOCUMENTS

| 2012/0130556 A1* | 5/2012 | Marhoefer | G05B 15/02 |
| | | | 700/291 |
| 2015/0303697 A1* | 10/2015 | Ploett | G05B 15/02 |
| | | | 700/287 |
| 2020/0073427 A1* | 3/2020 | Kobayashi | H02J 3/28 |

FOREIGN PATENT DOCUMENTS

| CN | 110416998 A | * | 11/2019 | ....... G06Q 10/06312 |
| CN | 111523947 A | * | 8/2020 | |
| CN | 110661277 B | * | 10/2022 | ....... G06Q 10/06312 |

OTHER PUBLICATIONS

K. Honghui, G. Shaoqing and N. Hui, "Virtual Power Plant Optimization Decision Method Considering the Interaction Between Combined Cooling-Heating and Power and Electric Heating Equipment," 2019 IEEE Innovative Smart Grid Technologies—Asia (ISGT Asia), Chengdu, China, 2019, pp. 4351-4355 (Year: 2019).*

(Continued)

*Primary Examiner* — Mohammad Ali
*Assistant Examiner* — Dhruvkumar Patel
(74) *Attorney, Agent, or Firm* — Grossman, Tucker, Perreault & Pfleger, PLLC

(57) ABSTRACT

The present invention relates to a method of assessing dynamic flexibility for a virtual power plant, which belongs to the technical field of operating and controlling a power system. The method equals a virtual power plant to an equivalent energy storage device and an equivalent generator and decouples a network constraint condition between the two types of devices through a Robust optimization method. Subsequently, by using a two-stage Robust optimization algorithm, parameters of the equivalent energy storage device and the equivalent generator are calculated and finally accurate depiction is realized on adjusting ability of a distributed resource, so as to provide a scientific decision basis for the virtual power plant to participate in grid control, such that it has a great value in an actual application.

17 Claims, 1 Drawing Sheet

(56) References Cited

OTHER PUBLICATIONS

N. Luo, L. Liu, F. Xie and T. Wu, "Flexibility Optimal Dispatch of the Distribution Network With Virtual Power Plant," 2020 IEEE 4th Conference on Energy Internet and Energy System Integration (EI2), Wuhan, China, 2020, pp. 178-184, doi: 10.1109/EI250167.2020.9346756. (Year: 2020).*

* cited by examiner

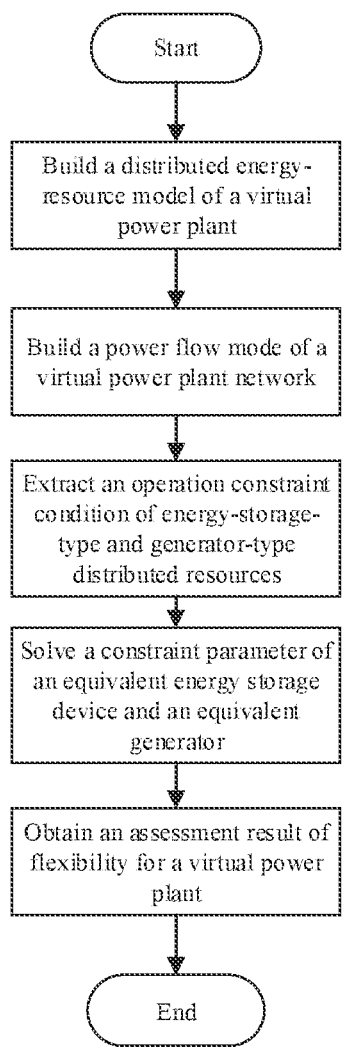

METHOD OF ACCESSING DYNAMIC FLEXIBILITY FOR VIRTUAL POWER PLANT

FIELD OF TECHNOLOGY

The present invention belongs to the technical field of operating and controlling a power system and in particular relates to a method of assessing dynamic flexibility for a virtual power plant.

BACKGROUND

A virtual power plant is an organic combination of a plurality of distributed energy and resources in a power distribution system and a virtual power plant operator realizes optimized scheduling of internal resources by matched control techniques, such that the virtual power plant operates to participate in grid as a special power plant. However, features of flexible resources inside the virtual power plant differ from each other and an output power of each device in the virtual power plant is restricted by a network constraint condition. Therefore, in optimized operation of the virtual power plant, it is necessary to satisfy a capacity constraint condition of a device, a branch capacity constraint condition and a node voltage constraint condition as well as a time-coupling constraint condition like an energy constraint condition and a climbing constraint condition of an energy storage device, which bring difficulties for assessing flexibility of the virtual power plant.

SUMMARY

For the above problems, the present invention provides a method of assessing dynamic flexibility for a virtual power plant, for fast solution of a constraint condition for flexibility ranges of an active power at a grid entry point in the virtual power plant at the precondition of considering an operation constraint for a device inside the virtual power plant and for maximum exploration of flexibility ranges of an output active power in the virtual power plant, so as to provide reference for scientific scheduling and decisions of grid.

The purpose of the present invention is to provide a method of assessing dynamic flexibility for a virtual power plant, comprising, firstly, building a distributed energy-resource model of a virtual power plant and a three-phase asymmetrical network model of the virtual power plant; secondly, splitting a device inside the virtual power plant into energy-storage-type and generator-type devices, and extracting an operation constraint condition of an equivalent energy storage device and an equivalent generator based on a Robust optimization method; and finally, solving a constraint parameter respectively for an equivalent energy storage device and an equivalent generator based on a two-stage robust optimization algorithm. The method provided realizes assessment of dynamic flexibility for the virtual power plant with consideration of time-coupling constraints. Compared with the prior method, the method is more definite in a physical sense and sufficient in exploration of flexibility ranges for the virtual power plant, thereby decreasing waste of flexibility for the virtual power plant. Therefore, it has a great value in an actual application.

The method of assessing dynamic flexibility for a virtual power plant, as provided in the present invention comprises the following steps:

(1) Building A Distributed Energy-Resource Model of A Virtual Power Plant (1.1) A Gas Turbine the output power constraint condition of the gas turbine is as follows:

$$\underline{P}_{i,\psi}^{CHP} \leq P_{i,\psi,t}^{CHP} \leq \overline{P}_{i,\psi}^{CHP} \tag{1}$$

$$\underline{Q}_{i,\psi}^{CHP} \leq Q_{i,\psi,t}^{CHP} \leq \overline{Q}_{i,\psi}^{CHP} \tag{2}$$

$$P_{i,t}^{CHP} = \sum_{\psi} P_{i,\psi,t}^{CHP} \tag{3}$$

wherein, $P_{i,\psi,t}^{CHP}$ denotes an output active power of the $\psi$-phase gas turbine at node i at moment t; $Q_{i,\psi,t}^{CHP}$ denotes an output inactive power of the $\psi$-phase gas turbine at node i at moment t; $\overline{P}_{i,\psi}^{CHP}$ denotes a maximum output active power of the $\psi$-phase gas turbine at node i; $\underline{P}_{i,\psi}^{CHP}$ denotes a minimum output active power of the $\psi$-phase gas turbine at node i; $\overline{Q}_{i,\psi}^{CHP}$ denotes a maximum output inactive power of the $\psi$-phase gas turbine at node i; $\underline{Q}_{i,\psi}^{CHP}$ denotes a minimum output inactive power of the $\psi$-phase gas turbine at node i; and $P_{i,t}^{CHP}$ denotes an output active power of the gas turbine at node i at moment t.

a climbing constraint condition of an active power of the gas turbine is as follows:

$$-r_i^{CHP} \leq P_{i,t}^{CHP} - P_{i,t-1}^{CHP} \leq r_i^{CHP} \tag{4}$$

wherein, $r_i^{CHP}$ denotes a climbing parameter of the gas turbine at node i and $P_{i,t-1}^{CHP}$ denotes an output active power of the $\psi$-phase gas turbine at node i at moment t−1.

(1.2) An Energy Storage Device the output power constraint condition of the energy storage device is as follows:

$$-\overline{P}_{i,\psi}^{ch} \leq P_{i,\psi,t}^{ESS} \leq \overline{P}_{i,\psi}^{dc} \tag{5}$$

$$(P_{i,\psi,t}^{ESS})^2 + (Q_{i,\psi,t}^{ESS})^2 \leq (\overline{S}_{i,\psi}^{ESS})^2 \tag{6}$$

$$P_{i,t}^{ESS} = \sum_{\psi} P_{i,\psi,t}^{ESS} \tag{7}$$

wherein, $P_{i,\psi,t}^{ESS}$ denotes a net output active power of the $\psi$-phase energy storage device at node i at moment t; $Q_{i,\psi,t}^{ESS}$ denotes a net output inactive power of the $\psi$-phase energy storage device at node i at moment t; $\overline{P}_{i,\psi}^{dc}$ denotes a maximum discharging active power of the $\psi$-phase energy storage device at node i; $\overline{P}_{i,\psi}^{ch}$ denotes a maximum charging active power of the $\psi$-phase energy storage device at node i; $\overline{S}_{i,\psi}^{ESS}$ denotes a maximum capacity of the $\psi$-phase energy storage device at node i; and $P_{i,t}^{ESS}$ denotes a net output active power of the energy storage device at node i at moment t.

formula (6) approximates the following linear formula:

$$-\overline{S}_{i,\psi}^{ESS} \leq P_{i,\psi,t}^{ESS} \leq \overline{S}_{i,\psi}^{ESS} \tag{8}$$

$$-\overline{S}_{i,\psi}^{ESS} \leq Q_{i,\psi,t}^{ESS} \leq \overline{S}_{i,\psi}^{ESS} \tag{9}$$

$$-\sqrt{2}\overline{S}_{i,\psi}^{ESS} \leq P_{i,\psi,t}^{ESS} + Q_{i,\psi,t}^{ESS} \leq \sqrt{2}\overline{S}_{i,\psi}^{ESS} \tag{10}$$

$$-\sqrt{2}\overline{S}_{i,\psi}^{ESS} \leq P_{i,\psi,t}^{ESS} - Q_{i,\psi,t}^{ESS} \leq \sqrt{2}\overline{S}_{i,\psi}^{ESS} \tag{11}$$

an energy constraint condition of the energy storage device is as follows:

$$\underline{E}_i^{ESS} \leq E_{i,t}^{ESS} \leq \overline{E}_i^{ESS} \tag{12}$$

$$E_{i,t}^{ESS} = \alpha_i^{ESS} E_{i,t-1}^{ESS} + P_{i,t}^{ESS} \Delta t \tag{13}$$

wherein, $E_{i,t}^{ESS}$ denotes energy of the energy storage device at moment t at node i; $E_{i,t-1}^{ESS}$ denotes energy of the energy storage device at moment t−1 at node i; $\underline{E}_i^{ESS}$ denotes minimum energy of the energy storage device at node i; $\overline{E}_i^{ESS}$ denotes maximum energy of the energy storage device at node i; $\alpha_i^{ESS}$ denotes a self-discharge rate of the energy storage device at node i; and $\Delta t$ denotes a time interval of two decision moments.

(1.3) A Photovoltaic Power Generation Device the output power constraint condition of the photovoltaic power generation device is as follows:

$$\underline{P}_{i,\psi}^{PV} \le P_{i,\psi,t}^{PV} \le \overline{P}_{i,\psi}^{PV} \tag{14}$$

$$(P_{i,\psi,t}^{PV})^2 + (Q_{i,\psi,t}^{PV})^2 \le (\overline{S}_{i,\psi}^{PV})^2 \tag{15}$$

$$P_{i,t}^{PV} = \sum_{\psi} P_{i,\psi,t}^{PV} \tag{16}$$

wherein, $P_{i,\psi,t}^{PV}$ denotes an output active power of the $\psi$-phase photovoltaic power generation device at node i at moment t; $Q_{i,\psi,t}^{PV}$ denotes an output inactive power of the $\psi$-phase photovoltaic power generation device at node i at moment t; $\underline{P}_{i,\psi}^{PV}$ denotes a minimum output active power of the $\psi$-phase photovoltaic power generation device at node i; $\overline{P}_{i,\psi}^{PV}$ denotes a maximum output active power of the $\psi$-phase photovoltaic power generation device at node i; $\overline{S}_{i,\psi}^{PV}$ denotes a maximum capacity of the $\psi$-phase photovoltaic power generation device at node i; and $P_{i,t}^{PV}$ denotes an output active power of the photovoltaic power generation device at node i at moment t.

formula (15) approximates the following linear formula:

$$-\overline{S}_{i,\psi}^{PV} \le P_{i,\psi,t}^{PV} \le \overline{S}_{i,\psi}^{PV} \tag{17}$$

$$-\overline{S}_{i,\psi}^{PV} \le Q_{i,\psi,t}^{PV} \le \overline{S}_{i,\psi}^{PV} \tag{18}$$

$$-\sqrt{2}\overline{S}_{i,\psi}^{PV} \le P_{i,\psi,t}^{PV}+Q_{i,\psi,t}^{PV} \le \sqrt{2}\overline{S}_{i,\psi}^{PV} \tag{19}$$

$$-\sqrt{2}\overline{S}_{i,\psi}^{PV} \le P_{i,\psi,t}^{PV}-Q_{i,\psi,t}^{PV} \le \sqrt{2}\overline{S}_{i,\psi}^{PV} \tag{20}$$

(1.4) A Wind Generator the output power constraint condition of the wind generator is as follows:

$$\underline{P}_{i,\psi}^{WT} \le P_{i,\psi,t}^{WT} \le \overline{P}_{i,\psi}^{WT} \tag{21}$$

$$(P_{i,\psi,t}^{WT})^2 + (Q_{i,\psi,t}^{WT})^2 \le (\overline{S}_{i,\psi}^{WT})^2 \tag{22}$$

$$P_{i,t}^{WT} = \sum_{\psi} P_{i,\psi,t}^{WT} \tag{23}$$

wherein, $P_{i,\psi,t}^{WT}$ denotes an output active power of the $\psi$-phase wind generator at node i at moment t; $Q_{i,\psi,t}^{WT}$ denotes an output inactive power of the $\psi$-phase wind generator at node i at moment t; $\underline{P}_{i,\psi}^{WT}$ denotes a minimum output active power of the $\psi$-phase wind generator at node i; $\overline{P}_{i,\psi}^{WT}$ denotes a maximum output active power of the $\psi$-phase wind generator at node i; $\overline{S}_{i,\psi}^{WT}$ denotes a maximum capacity of the $\psi$-phase wind generator at node i; and $P_{i,t}^{WT}$ denotes a total output active power of the wind generator at node i at moment t.

formula (22) approximates the following linear formula:

$$-\overline{S}_{i,\psi}^{WT} \le P_{i,\psi,t}^{WT} \le \overline{S}_{i,\psi}^{WT} \tag{24}$$

$$-\overline{S}_{i,\psi}^{WT} \le Q_{i,\psi,t}^{WT} \le \overline{S}_{i,\psi}^{WT} \tag{25}$$

$$-\sqrt{2}\overline{S}_{i,\psi}^{WT} \le P_{i,\psi,t}^{WT}+Q_{i,\psi,t}^{WT} \le \sqrt{2}\overline{S}_{i,\psi}^{WT} \tag{26}$$

$$-\sqrt{2}\overline{S}_{i,\psi}^{WT} \le P_{i,\psi,t}^{WT}-Q_{i,\psi,t}^{WT} \le \sqrt{2}\overline{S}_{i,\psi}^{WT} \tag{27}$$

(1.5) A Demand-Side Responsive Heating Load the output power constraint condition of the demand-side responsive heating load is as follows:

$$\underline{P}_{i,\psi}^{HVAC} \le P_{i,\psi,t}^{HVAC} \le \overline{P}_{i,\psi}^{HVAC} \tag{28}$$

$$Q_{i,\psi,t}^{HVAC} = P_{i,\psi,t}^{HVAC}\tan(\varphi_i^{HVAC}) \tag{29}$$

$$P_{i,t}^{HVAC} = \sum_{\psi} P_{i,\psi,t}^{HVAC} \tag{30}$$

wherein, $P_{i,\psi,t}^{HVAC}$ denotes an active power of the $\psi$-phase demand-side responsive heating load at node i at moment t; $Q_{i,\psi,t}^{HVAC}$ denotes an inactive power of $\psi$-phase demand-side responsive heating load at node i at moment t; $\varphi_i^{HVAC}$ denotes a power coefficient of the demand-side responsive heating load at node i at moment t; $\overline{P}_{i,\psi}^{HVAC}$ denotes a maximum active power of $\psi$-phase demand-side responsive heating load at node i; $\underline{P}_{i,\psi}^{HVAC}$ denotes a minimum active power of the $\psi$-phase demand-side responsive heating load at node i; and $P_{i,t}^{HVAC}$ denotes a total output active power of the demand-side responsive heating load at node i at moment t.

a temperature constraint of a heating load device is as follows:

$$T_{i,t}^{HVAC}=T_{i,t-1}^{HVAC}+\alpha_i^{HVAC}(T_{i,t}^{ENV}-T_{i,t-1}^{HVAC})+ \beta_i^{HVAC}P_{i,t}^{HVAC} \tag{31}$$

$$\underline{T}_i^{HVAC} \le T_{i,t}^{HVAC} \le \overline{T}_i^{HVAC} \tag{32}$$

wherein, $T_{i,t}^{HVAC}$ demotes a temperature of the demand-side responsive heating load at node i at moment; $T_{i,t-1}^{HVAC}$ denotes a temperature of the demand-side responsive heating load at node i at moment t−1; $T_{i,t}^{ENV}$ denotes an outdoor temperature of the demand-side responsive heating load at node i at moment t; $\alpha_i^{HVAC}$ denotes a heat dissipation parameter of the demand-side responsive heating load at node i; $\beta_i^{HVAC}$ denotes an electricity-heat conversion parameter of the demand-side responsive heating load at node i; $\underline{T}_i^{HVAC}$ denotes a lower temperature limit of the demand-side responsive heating load at node i; and $\overline{T}_i^{HVAC}$ denotes an upper temperature limit of the demand-side responsive heating load at node i.

(1.6) An Electric Vehicle Charging Station the output power constraint condition of the electric vehicle charging station is as follows:

$$\underline{P}_{i,\psi,t}^{EV} \le P_{i,\psi,t}^{EV} \le \overline{P}_{i,\psi,t}^{EV} \tag{33}$$

$$Q_{i,\psi,t}^{EV} = P_{i,\psi,t}^{EV}\tan(\varphi_i^{EV}) \tag{34}$$

$$P_{i,t}^{EV} = \sum_{\psi} P_{i,\psi,t}^{EV} \tag{35}$$

Wherein, $P_{i,\psi,t}^{EV}$ denotes an active power of the $\psi$-phase electric vehicle charging station at node i at moment t; $Q_{i,\psi,t}^{EV}$ denotes an inactive power of the $\psi$-phase electric vehicle charging station at node i at moment t; $\varphi_i^{EV}$ denotes a power coefficient of the electric vehicle charging station at node i; $\overline{P}_{i,\psi,t}^{EV}$ denotes a maximum active power of the $\psi$-phase electric vehicle charging station at node i at moment t; $\underline{P}_{i,\psi,t}^{EV}$ denotes a minimum active power of the $\psi$-phase electric vehicle charging station at node i; and $P_{i,t}^{EV}$ denotes a total output active power of the electric vehicle charging station at node i at moment t.

an energy constraint of the electric vehicle charging station is as follows:

$$\underline{E}_{i,t}^{EV} \leq \sum_{\tau=1}^{t} P_{i,\tau}^{EV} \Delta t \leq \overline{E}_{i,t}^{EV} \quad (36)$$

wherein $\overline{E}_{i,t}^{EV}$ denotes a maximum output energy of the electric vehicle charging station at node i at moment t; and $\underline{E}_{i,t}^{EV}$ denotes a minimum output energy of the electric vehicle charging station at node i at moment t.

(2) Building A Power Flow Model for the Virtual Power Plant Network

Based on a three-phase asymmetrical linear power flow model, each voltage magnitude and each branch current for each node, and an injection active power, and an injection inactive power of a grid entry point in the virtual power plant network are represented as follows:

$$V = Cy + c \quad (37)$$

$$i_{ij} = Dy + d \quad (38)$$

$$p_0 = Gy + g \quad (39)$$

$$q_0 = Hy + h \quad (40)$$

Wherein, V denotes a vector consisting of a magnitude of each node and each phase voltage; $i_{ij}$ denotes a vector consisting of each branch current; $p_0$ denotes an injection active power of the grid entry point in the virtual power plant; $q_0$ denotes an injection inactive power of the grid entry point in the virtual power plant; matrices C, D, G and H, vectors c and d, and constants g and h are constant parameters of a system; y denotes a vector consisting of the injection power vector, that is, $y := [(p^Y)^T, (q^Y)^T, (p^\Delta)^T, (q^\Delta)^T]^T$, wherein $p^Y, p^\Delta, q^Y, q^\Delta$ respectively denotes a vector consisting of the injection active power of a Y-type grid entry node, a vector consisting of the injection active power of a $\Delta$-type grid entry node, a vector consisting of an injected inactive power of a Y-type grid entry node, and a vector consisting of an injected inactive power node of a $\Delta$-type grid entry node.

for $\forall i \in N_Y, \psi \in \phi_Y$, the injection power vector of nodes of each type at each moment can be calculated as:

$$p_{i,\psi,t}^Y = P_{i,\psi,t}^{CHP} + P_{i,\psi,t}^{ESS} + P_{i,\psi,t}^{PV} + P_{i,\psi,t}^{WT} - P_{i,\psi,t}^{HVAC} - P_{i,\psi,t}^{EV} - P_{i,\psi,t}^{LOAD} \quad (41)$$

$$q_{i,\psi,t}^Y = Q_{i,\psi,t}^{CHP} + Q_{i,\psi,t}^{ESS} + Q_{i,\psi,t}^{PV} + Q_{i,\psi,t}^{WT} - Q_{i,\psi,t}^{HVAC} - Q_{i,\psi,t}^{EV} - Q_{i,\psi,t}^{LOAD} \quad (42)$$

for $\forall i \in N_\Delta, \psi \in \phi_\Delta$:

$$p_{i,\psi,t}^\Delta = P_{i,\psi,t}^{CHP} + P_{i,\psi,t}^{ESS} + P_{i,\psi,t}^{PV} + P_{i,\psi,t}^{WT} - P_{i,\psi,t}^{HVAC} - P_{i,\psi,t}^{EV} - P_{i,\psi,t}^{LOAD} \quad (43)$$

$$q_{i,\psi,t}^\Delta = Q_{i,\psi,t}^{CHP} + Q_{i,\psi,t}^{ESS} + Q_{i,\psi,t}^{PV} + Q_{i,\psi,t}^{WT} - Q_{i,\psi,t}^{HVAC} - Q_{i,\psi,t}^{EV} - Q_{i,\psi,t}^{LOAD} \quad (44)$$

wherein, $P_{i,\psi,t}^{LOAD}$ denotes an active power of the $\psi$-phase load at node i at moment t; $Q_{i,\psi,t}^{LOAD}$ denotes an inactive power of the $\psi$-phase load at node i at moment t; $p_{i,\psi,t}^Y$ denotes an injection active power of the $\psi$-phase Y-type grid entry node at node i at moment t; $q_{i,\psi,t}^Y$ denotes an injection inactive power of the $\psi$-phase Y-type grid entry node at node i at moment t; $p_{i,\psi,t}^\Delta$ denotes an injection active power of the $\psi$-phase $\Delta$-type grid entry node at node i at moment t; $q_{i,\psi,t}^\Delta$ denotes an injection inactive power of the $\psi$-phase $\Delta$-type grid entry node at node i at moment t; $N_Y$ denotes a set consisting of serial numbers of Y-type grid entry nodes; $N_\Delta$ denotes a set consisting of serial numbers of $\Delta$-type grid entry nodes; $\phi_Y$ denotes a set consisting of phases of Y-type grid entry nodes; and $\phi_\Delta$ denotes a set consisting of phases of $\Delta$-type grid entry nodes.

The network constraint condition of the virtual power plant is as follows:

$$\underline{V} \leq V \leq \overline{V} \quad (45)$$

$$-\overline{i}_{ij} \leq i_{ij} \leq \overline{i}_{ij} \quad (46)$$

Wherein, $\underline{V}$ denotes a vector consisting of a minimum voltage at each phase and each node; $\overline{V}$ denotes a vector consisting of a maximum voltage at each phase and each node; and $\overline{i}_{ij}$ denotes a vector consisting of a maximum current for each branch.

(3) Extracting an Operation Constraint Condition of Energy-Storage-Type and Generator-Type Distributed Resources (3.1) Building Three Types of Decision Variable Vectors Defining a decision variable vector consisting of an active output power and an inactive output power of all distributed generation resources as x, a constraint condition consisting of formulas (1)-(5), (7)-(14), (16)-(21), (23)-(38) and (45)-(46) can be represented as a form of a following matrix:

$$Mx \leq n \quad (47)$$

Wherein, matrix M and vector n are constant constraint parameters organized based on the constraint condition.

An element x in the decision variable vector can be divided into the following three types: (1) defining all energy storage devices, demand-side responsive heating load and electric vehicle charging stations as energy-storage-type devices, and a decision variable vector consisting of output active power of all energy-storage-type devices as $P_E$; (ii) defining all gas turbines, photovoltaic power generation devices and wind generator devices as generator-type devices, and a decision variable consisting of output active power of all generator-type device as $P_G$; and (iii) defining a decision variable consisting of inactive power of all distributed energy-resource devices as Q. Formula (47) can be rewritten as:

$$M \begin{bmatrix} P_E \\ P_G \\ Q \end{bmatrix} \leq n \quad (48)$$

(3.2) On the Basis of Extracting an Operation Constraint Condition of Distributed Resources of Generator-Type Devices regarding $P_G$ as a random parameter in Robust optimization, a parameter in formula (48) is written in a form of the following block matrix:

$$\begin{bmatrix} 0 & M_{G0} & 0 \\ M_E^E & M_G^E & M_Q^E \end{bmatrix} \begin{bmatrix} P_E \\ P_G \\ Q \end{bmatrix} \leq \begin{bmatrix} n_1^E \\ n_2^E \end{bmatrix} \quad (49)$$

wherein, $M_{G0}, M_E^E, M_G^E$ and $M_Q^E$ are corresponding blocks in matrix M; and $n_1^E$ and $n_2^E$ are corresponding blocks in vector n;

a constraint relation between parameters $P_G$ in formula (49) and a constraint relation between variables $P_E$, Q and parameters $P_G$ are extracted and represented as formula (50) and formula (51) respectively:

$$M_{G0}P_G \leq n_1^E \quad (50)$$

$$M_E^E P_E + M_Q^E Q \leq n_2^E - M_G^E P_G \quad (51)$$

solution of a Robust optimization problem: for any $P_G$ that satisfies a constraint condition $M_{G0}P_G \leq n_1^E$, a constraint condition of formula (51) is made true constantly, which is equivalent to solution of an optimization problem in formula (52)

$$\left(M_E^E P_E + M_Q^E Q\right)_i \leq \min_{P_G}\left\{\left(n_2^E - M_G^E P_G\right)_i \mid \forall P_G, M_{G0}P_G \leq n_1^E\right\} \quad (52)$$

wherein, an operator $(\bullet)_i$ denotes elements at $i^{th}$ line of the matrix or vector.

an operation constraint condition of energy-storage-type distributed resources is obtained as:

$$E_E x_E \leq f_E \quad (53)$$

wherein matrix $E_E$ and vector $f_E$ are parameters obtained by solving the Robust optimization problem in formula (52); and $x_E$ is a decision variable of equivalent energy storage, that is:

$$E_E = \begin{bmatrix} M_E^E & M_Q^E \end{bmatrix} \quad (54)$$

$$(f_E)_i = \min_{P_G}\left\{\left(n_2^E - M_G^E P_G\right)_i \mid \forall P_G, M_{G0}P_G \leq n_1^E\right\} \quad (55)$$

$$x_E = \begin{bmatrix} P_E \\ Q \end{bmatrix} \quad (56)$$

(3.3) On the Basis of Extracting an Operation Constraint Condition of Distributed Resources of Energy-Storage-Type Devices regarding $P_E$ as a random parameter in Robust optimization, a parameter in formula (48) is written in a form of the following block matrix:

$$\begin{bmatrix} M_{E0} & 0 & 0 \\ M_E^G & M_G^G & M_Q^G \end{bmatrix} \begin{bmatrix} P_E \\ P_G \\ Q \end{bmatrix} \leq \begin{bmatrix} n_1^G \\ n_2^G \end{bmatrix} \quad (57)$$

wherein, $M_{E0}$, $M_E^G$, $M_G^G$ and $M_Q^G$ are corresponding blocks in matrix M; and $n_1^G$ and $n_2^G$ are corresponding blocks in vector n.

a constraint relation between parameters $P_E$ in formula (49) and a constraint relation between variables $P_G$, Q and parameters $P_G$ are extracted and represented as formula (58) and formula (59) respectively:

$$M_{E0}P_E \leq n_1^G \quad (58)$$

$$M_G^G P_G + M_Q^G Q \leq n_2^G - M_E^G P_E \quad (59)$$

solution of a Robust optimization problem: for any $P_E$ that satisfies a constraint condition $M_{E0}P_E \leq n_1^G$, a constraint condition of formula (59) is made true constantly, which is equivalent to solution of an optimization problem in formula (60):

$$\left(M_G^G P_G + M_Q^G Q\right)_i \leq \min_{P_E}\left\{\left(n_2^G - M_E^G P_E\right)_i \mid \forall P_E, M_{E0}P_E \leq n_1^G\right\} \quad (60)$$

an operation constraint condition of energy-storage-type distributed resources is obtained as:

$$E_G x_G \leq f_G \quad (61)$$

wherein, matrix $E_G$ and vector $f_G$ are parameters obtained by solving the Robust optimization problem in formula (60); and $x_G$ is a decision variable of an equivalent generator, that is:

$$E_G = \begin{bmatrix} M_G^G & M_Q^G \end{bmatrix} \quad (62)$$

$$(f_G)_i = \min_{P_E}\left\{\left(n_2^G - M_E^G P_E\right)_i \mid \forall P_E, M_{E0}P_E \leq n_1^G\right\} \quad (63)$$

$$x_G = \begin{bmatrix} P_G \\ Q \end{bmatrix} \quad (64)$$

(4) Solving A Constraint Parameter of an Equivalent Energy-Storage-Type Device and an Equivalent Generator-Type Device (4.1) Solving A Constraint Parameter of an Equivalent Energy-Storage-Type Device a constraint parameter of an equivalent energy storage device is divided into major problems (65)-(68) and minor problems (72)-(75) to be solved.

the major problems are reflected as the following forms:

$$\max_{b_E} u_E^T b_E \quad (65)$$

$$\text{s.t. } A_E \xi_k^* \geq b_E - M(1 - z_k), \forall k \leq K \quad (66)$$

$$1^T z_k \geq 1, \forall k \leq K \quad (67)$$

$$z_k \in \{0, 1\}^{n_z}, \forall k \leq K \quad (68)$$

wherein, matrix $A_E$ is a constant matrix denoting upper and lower limits of an output power of equivalent energy storage and a constraint parameter of upper and lower energy limits of energy storage, with a specific form thereof indicated by formula (69); vector $b_E$ denotes an intercept of each high-dimension hyperplane for a polyhedron of a flexible and feasible region; vector $u_E$ is a constant matrix denoting sum of distances for a parallel plane of a flexible and feasible region, with a specific form thereof indicated by formula (70); vector $\xi$ denotes an active power output track of an equivalent energy storage device; matrix $C_E$ and vector $d_E$ are a constant matrix denoting a relation between a decision variable $x_E$ of an equivalent energy storage device and an active power output track $\xi$, with a value thereof obtained by formula (39). K denotes a total number of scenes; $\xi^*_k$ denotes an output active power track of an equivalent energy storage device in a $k^{th}$ scene; $z_k$ denotes a vector of a $k^{th}$ scene consisting of a 0/1 decision variable; $n_z$ denotes a dimensional number of $z_k$; and M denotes a very big constant with a value thereof generally being $1 \times 10^6$.

$$A_E = [I_T - I_T \Gamma^T - \Gamma^T]^T \quad (69)$$

$$u_E = [1_T^T - 1_T^T 1_{T-1}^T - 1_{T-1}^T]^T \quad (70)$$

wherein, T denotes the number of moments considered; $I_T$ denotes a unit array when a dimensional number is T; $1_T$ denotes a total 1-row vector with T elements; and matrix $\Gamma$ is defined as shown in (71):

$$\Gamma = \begin{bmatrix} \gamma & 0 & \cdots & 0 \\ \gamma^2 & \gamma & \cdots & 0 \\ \vdots & \vdots & \ddots & \vdots \\ \gamma^T & \gamma^{T1} & \cdots & \gamma \end{bmatrix} \quad (71)$$

wherein, γ denotes a self-discharge rate of an equivalent energy storage device.

the minor problems are reflected as the following forms:

$$\min_{\xi} \max_{x_E} 0 \tag{72}$$

$$\text{s.t. } A_E \xi \le b_E^* \tag{73}$$

$$\xi = C_E x_E + d_E \tag{74}$$

$$E_E x_E \le f_E \tag{75}$$

wherein, $b^*_E$ denotes a result obtained by optimization of the major problem.

to facilitate solution, antithetic and KKT conditions are used successively to convert the minor problems (72)-(75) into a mixed integer planning problem shown by formula (76):

$$\min_{\xi,\pi,\lambda,\omega,s} f_E = \lambda^T f_E - \pi^T d_E - \omega^T b_E^* \tag{76}$$

$$\text{s.t. } C_E^T \pi + E_E^T \lambda = 0$$

$$A_E^T \omega + \pi \ge 0$$

$$0 \le b_E^* - A_E \xi \le M(1-s)$$

$$0 \le \omega \le Ms$$

$$s \in \{0,1\}^{n_s}$$

$$\lambda \ge 0$$

wherein, s denotes a vector consisting of a 0/1 decision variable; $n_s$ denotes a dimensional number of s; ω denotes an antithetic variable of constraint (73); π denotes am antithetic variable of constraint (74); and λ denotes an antithetic variable of constraint (75).

A constraint parameter solution algorithm process of an equivalent energy-storage-type device is as follows:
  a. initializing: allowing K=0;
  b. solving the major problems (65)-(68), thereby obtaining an optimal solution $b^*_E$;
  c. based on the optimal solution $b^*_E$, solving an equivalence problem (76) of the minor problem, thereby obtaining an optimal solution $\xi^*_{K+1}$ and a target function value $f^*_E$;
  d. if $f^*_E < 1 \times 10^{-6}$ meets, ending algorithm with $b^*_E$ as a final solution result; otherwise, adding following constraint condition (77)-(79) to the major problem and allowing K←K+1, and returning to the step b.

$$A_E \xi^*_{K+1} \ge b_E - M(1 - z_{K+1}) \tag{77}$$

$$1^T z_{K+1} \ge 1 \tag{78}$$

$$z_{K+1} \in \{0,1\}^{n_z} \tag{79}$$

$\xi^*_{K+1}$ denotes a constant vector added to a major problem iterated for the K+1 time with a value thereof as an optimal solution of a previous iteration; and $z_{K+1}$ denotes a variable consisting of a 0/1 decision vector in iteration process of the K+1 time.

(4.2) Solving A Constraint Parameter of an Equivalent Generator a constraint parameter of an equivalent generator is divided into major problem (80)-(83) and minor problems (87)-(90) to be solved.

the major problems are reflected as the following forms:

$$\max_{b_o} u_G^T b_o \tag{80}$$

$$\text{s.t. } A_G \xi_k^* \ge b_G - M(1 - z_k), \forall k \le K \tag{81}$$

$$1^T z_k \ge 1, \forall k \le K \tag{82}$$

$$z_k \in \{0,1\}^{n_z}, \forall k \le K \tag{83}$$

wherein, matrix $A_G$ is a constant matrix denoting upper and lower limits of an output power of an equivalent generator and a constraint parameter of upper and lower climbing limits, with a specific form thereof indicated by formula (84); vector $b_G$ denotes an intercept of each high-dimension hyperplane for a polyhedron of a flexible and feasible region; vector $u_G$ is a constant matrix denoting sum of distances for a parallel plane of a flexible and feasible region, with a specific form thereof indicated by formula (85); vector ξ denotes an active power output track of an equivalent generator; matrix $C_G$ and vector $d_G$ are a constant matrix denoting a relation between a decision variable $x_G$ of an equivalent generator and an active power output track ξ, with a value thereof obtained by formula (39).

$$A_G = [I_T - I_T \Lambda^T - \Lambda^T]^T \tag{84}$$

$$u_G = [1_T^T - 1_T^T 1_{T-1}^T - 1_{T-1}^T]^T \tag{85}$$

wherein, $1_{T-1}$ denotes a total 1-row vector with T−1 elements; and matrix Λ is a matrix having a size of (T−1)×T, which is defined as shown in (86):

$$\Lambda = \begin{bmatrix} -1 & 1 & 0 & \cdots & 0 \\ 0 & -1 & 1 & \cdots & 0 \\ \vdots & \vdots & \ddots & \ddots & \vdots \\ 0 & 0 & \cdots & -1 & 1 \end{bmatrix} \tag{86}$$

the minor problems are reflected as the following forms:

$$\min_{\xi} \max_{x_G} 0 \tag{87}$$

$$\text{s.t. } A_G \xi \le b_G^* \tag{88}$$

$$\xi = C_G x_G + d_G \tag{89}$$

$$E_G x_G \le f_G \tag{90}$$

wherein, $b^*_G$ denotes a result obtained by optimization of the major problem.

To facilitate solution, antithetic and KKT conditions are used successively to convert the minor problems (87)-(90) into a mixed integer planning problem shown by formula (91):

$$\min_{\xi,\pi,\lambda,\omega,s} f_G = \lambda^T f_G - \pi^T d_G - \omega^T b_G^* \tag{91}$$

$$\text{s.t. } C_G^T \pi + E_G^T \lambda = 0$$

$$A_G^T \omega + \pi \ge 0$$

$$0 \le b_G^* - A_G \xi \le M(1-s)$$

$$0 \le \omega \le M_s$$

-continued $$s \in \{0, 1\}^{n_s}$$

$$\lambda \geq 0$$

Wherein, ω denotes an antithetic variable of constraint (88); π denotes am antithetic variable of constraint (89); and λ denotes an antithetic variable of constraint (90).

A constraint parameter solution algorithm process of an equivalent generator is as follows:
a. initializing: allowing K=0;
b. solving the major problems (80)-(83), thereby obtaining an optimal solution $b^*_G$;
c. based on the optimal solution $b^*_G$, solving an equivalence problem (76) of the minor problems, thereby obtaining an optimal solution $\xi^*_{K+1}$ and a target function value $f^*_G$;
d. if $f^*_G < 1 \times 10^{-6}$ meets, ending algorithm with $b^*_G$ as a final solution result; otherwise, adding following constraint condition (92)-(94) to the major problem and allowing K←K+1, and returning to the step b;

$$A_G \xi^*_{K+1} \geq b_G - M(1 - z_{K+1}) \tag{92}$$

$$1^T z_{K+1} \geq 1 \tag{93}$$

$$z_{K+1} \in \{0,1\}^{n_z} \tag{94}$$

$\xi^*_{K+1}$ denotes a constant vector added to a major problem iterated for the K+1 time with a value thereof as an optimal solution of a previous iteration; and $z_{K+1}$ denotes a variable consisting of a 0/1 decision vector in iteration process of the K+1 time.

(5) Obtaining an Assessment Result of Flexibility for the Virtual Power Plant an assessment result of flexibility for the virtual power plant is obtained based on the result in the step (4), that is, a virtual power plant can be equaled to an equivalent energy-storage-type device and an equivalent generator-type device, and flexibility ranges of the two types of device are respectively shown in formula (95) and formula (96). An output active power of the virtual power plant is denoted in a form of formula (97).

$$A_E P_{ESS} \leq b^*_E \tag{95}$$

$$A_G P_{GEN} \leq b^*_G \tag{96}$$

$$P_{VPP} = P_{ESS} + P_{GEN} \tag{97}$$

wherein $P_{ESS}$ denotes a vector consisting of output active power of equivalent energy-storage-type devices at each moment; $P_{GEN}$ denotes a vector consisting of output active power of equivalent generator-type devices at each moment; and $P_{VPP}$ denotes a vector consisting an output active power of a virtual power plant at each moment.

Other features and advantages of the present invention will be stated in the subsequent description and partially become apparent from the description or understood by implementing the present invention. The purpose and other advantages of the present invention can be realized and obtained by a structure as pointed out in the description, claims and accompanying drawings.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

FIG. 1 is a flow chart of a method of assessing dynamic flexibility for a virtual power plant.

DESCRIPTION OF THE EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Embodiments

With a method of assessing dynamic flexibility for a virtual power plant, what is shown in FIG. 1 is a flow chart of a method of assessing dynamic flexibility for a virtual power plant. It can be known from FIG. 1 that the method involves building a distributed energy-resource model of a virtual power plant and a power flow model of a virtual power plant network; extracting an operation constraint condition of energy-storage-type and generator-type distributed resources; solving a constraint parameter of an equivalent energy storage device and an equivalent generator and finally obtaining an assessment result of flexibility for the virtual power plant. The method may specifically comprises the following steps:

(1) Building A Distributed Energy-Resource Model of A Virtual Power Plant (1.1) A Gas Turbine the output power constraint condition of the gas turbine is as follows:

$$\underline{P}^{CHP}_{i,\psi} \leq P^{CHP}_{i,\psi,t} \leq \overline{P}^{CHP}_{i,\psi} \tag{1}$$

$$\underline{Q}^{CHP}_{i,\psi} \leq Q^{CHP}_{i,\psi,t} \leq \overline{Q}^{CHP}_{i,\psi} \tag{2}$$

$$P^{CHP}_{i,t} = \sum_{\psi} P^{CHP}_{i,\psi,t} \tag{3}$$

wherein, $P^{CHP}_{i,\psi,t}$ denotes an output active power of the ψ-phase gas turbine at node i at moment t; $Q^{CHP}_{i,\psi,t}$ denotes an output inactive power of the ψ-phase gas turbine at node i at moment t; $\overline{P}^{CHP}_{i,\psi}$ denotes a maximum output active power of the ψ-phase gas turbine at node i; $\underline{P}^{CHP}_{i,\psi}$ denotes a minimum output active power of the ψ-phase gas turbine at node i; $\overline{Q}^{CHP}_{i,\psi}$ denotes a maximum output inactive power of the ψ-phase gas turbine at node i; $\underline{Q}^{CHP}_{i,\psi}$ denotes a minimum output inactive power of the ψ-phase gas turbine at node i; and $P^{CHP}_{i,t}$ denotes an output active power of the gas turbine at node i at moment t;

a climbing constraint condition of an active power of the gas turbine is as follows:

$$-r^{CHP}_i \leq P^{CHP}_{i,t} - P^{CHP}_{i,t-1} \leq r^{CHP}_i \tag{4}$$

wherein, $r_i^{CHP}$ denotes a climbing parameter of the gas turbine at node i and $P_{i,t-1}^{CHP}$ denotes an output active power of the ψ-phase gas turbine at node i at moment t−1.

(1.2) An Energy Storage Device the output power constraint condition of the energy storage device is as follows:

$$-\overline{P}_{i,\psi}^{ch} \leq P_{i,\psi,t}^{ESS} \leq \overline{P}_{i,\psi}^{dc} \quad (5)$$

$$(P_{i,\psi,t}^{ESS})^2 + (Q_{i,\psi,t}^{ESS})^2 \leq (\overline{S}_{i,\psi}^{ESS})^2 \quad (6)$$

$$P_{i,t}^{ESS} = \sum_\psi P_{i,\psi,t}^{ESS} \quad (7)$$

wherein, $P_{i,\psi,t}^{ESS}$ denotes a net output active power of the ψ-phase energy storage device at node i at moment t; $Q_{i,\psi,t}^{ESS}$ denotes a net output inactive power of the ψ-phase energy storage device at node i at moment t; $\overline{P}_{i,\psi}^{dc}$ denotes a maximum discharging active power of the ψ-phase energy storage device at node i; $\overline{P}_{i,\psi}^{ch}$ denotes a maximum charging active power of the ψ-phase energy storage device at node i; $\overline{S}_{i,\psi}^{ESS}$ denotes a maximum capacity of the ψ-phase energy storage device at node i; and $P_{i,t}^{ESS}$ denotes a net output active power of the energy storage device at node i at moment t.

formula (6) approximates the following linear formula:

$$-\overline{S}_{i,\psi}^{ESS} \leq P_{i,\psi,t}^{ESS} \leq \overline{S}_{i,\psi}^{ESS} \quad (8)$$

$$-\overline{S}_{i,\psi}^{ESS} \leq Q_{i,\psi,t}^{ESS} \leq \overline{S}_{i,\psi}^{ESS} \quad (9)$$

$$-\sqrt{2}\overline{S}_{i,\psi}^{ESS} \leq P_{i,\psi,t}^{ESS} + Q_{i,\psi,t}^{ESS} \leq \sqrt{2}\overline{S}_{i,\psi}^{ESS} \quad (10)$$

$$-\sqrt{2}\overline{S}_{i,\psi}^{ESS} \leq P_{i,\psi,t}^{ESS} - Q_{i,\psi,t}^{ESS} \leq \sqrt{2}\overline{S}_{i,\psi}^{ESS} \quad (11)$$

an energy constraint condition of the energy storage device is as follows:

$$\underline{E}_i^{ESS} \leq E_{i,t}^{ESS} \leq \overline{E}_i^{ESS} \quad (12)$$

$$E_{i,t}^{ESS} = \alpha_i^{ESS} E_{i,t-1}^{ESS} + P_{i,t}^{ESS} \Delta t \quad (13)$$

wherein, $E_{i,t}^{ESS}$ denotes energy of the energy storage device at moment t at node i; $E_{i,t-1}^{ESS}$ denotes energy of the energy storage device at moment t−1 at node i; $\underline{E}_i^{ESS}$ denotes minimum energy of the energy storage device at node i; $\overline{E}_i^{ESS}$ denotes maximum energy of the energy storage device at node i; $\alpha_i^{ESS}$ denotes a self-discharge rate of the energy storage device at node i; and $\Delta t$ denotes a time interval of two decision moments.

(1.3) A Photovoltaic Power Generation Device the output power constraint condition of the photovoltaic power generation device is as follows:

$$\underline{P}_{i,\psi}^{PV} \leq P_{i,\psi,t}^{PV} \leq \overline{P}_{i,\psi}^{PV} \quad (14)$$

$$(P_{i,\psi,t}^{PV})^2 + (Q_{i,\psi,t}^{PV})^2 \leq (\overline{S}_{i,\psi}^{PV})^2 \quad (15)$$

$$P_{i,t}^{PV} = \sum_\psi P_{i,\psi,t}^{PV} \quad (16)$$

wherein, $P_{i,\psi,t}^{PV}$ denotes an output active power of the ψ-phase photovoltaic power generation device at node i at moment t; $Q_{i,\psi,t}^{PV}$ denotes an output inactive power of the ψ-phase photovoltaic power generation device at node i at moment t; $\underline{P}_{i,\psi}^{PV}$ denotes a minimum output active power of the ψ-phase photovoltaic power generation device at node i; $\overline{P}_{i,\psi}^{PV}$ denotes a maximum output active power of the ψ-phase photovoltaic power generation device at node i; $\overline{S}_{i,\psi}^{PV}$ denotes a maximum capacity of the ψ-phase photovoltaic power generation device at node i; and $P_{i,t}^{PV}$ denotes an output active power of the photovoltaic power generation device at node i at moment t;

formula (15) approximates the following linear formula:

$$-\overline{S}_{i,\psi}^{PV} \leq P_{i,\psi,t}^{PV} \leq \overline{S}_{i,\psi}^{PV} \quad (17)$$

$$-\overline{S}_{i,\psi}^{PV} \leq Q_{i,\psi,t}^{PV} \leq \overline{S}_{i,\psi}^{PV} \quad (18)$$

$$-\sqrt{2}\overline{S}_{i,\psi}^{PV} \leq P_{i,\psi,t}^{PV} + Q_{i,\psi,t}^{PV} \leq \sqrt{2}\overline{S}_{i,\psi}^{PV} \quad (19)$$

$$-\sqrt{2}\overline{S}_{i,\psi}^{PV} \leq P_{i,\psi,t}^{PV} - Q_{i,\psi,t}^{PV} \leq \sqrt{2}\overline{S}_{i,\psi}^{PV} \quad (20)$$

(1.4) A Wind Generator the output power constraint condition of the wind generator is as follows:

$$\underline{P}_{i,\psi}^{WT} \leq P_{i,\psi,t}^{WT} \leq \overline{P}_{i,\psi}^{WT} \quad (21)$$

$$(P_{i,\psi,t}^{WT})^2 + (Q_{i,\psi,t}^{WT})^2 \leq (\overline{S}_{i,\psi}^{WT})^2 \quad (22)$$

$$P_{i,t}^{WT} = \sum_\psi P_{i,\psi,t}^{WT} \quad (23)$$

Wherein $P_{i,\psi,t}^{WT}$ denotes an output active power of the ψ-phase wind generator at node i at moment t; $Q_{i,\psi,t}^{WT}$ denotes an output inactive power of the ψ-phase wind generator at node i at moment t; $\underline{P}_{i,\psi}^{WT}$ denotes a minimum output active power of the ψ-phase wind generator at node i; $\overline{P}_{i,\psi}^{WT}$ denotes a maximum output active power of the ψ-phase wind generator at node i; $\overline{S}_{i,\psi}^{WT}$ denotes a maximum capacity of the ψ-phase wind generator at node i; and $P_{i,t}^{WT}$ denotes a total output active power of the wind generator at node i at moment t;

formula (22) approximates the following linear formula:

$$-\overline{S}_{i,\psi}^{WT} \leq P_{i,\psi,t}^{WT} \leq \overline{S}_{i,\psi}^{WT} \quad (24)$$

$$-\overline{S}_{i,\psi}^{WT} \leq Q_{i,\psi,t}^{WT} \leq \overline{S}_{i,\psi}^{WT} \quad (25)$$

$$-\sqrt{2}\overline{S}_{i,\psi}^{WT} \leq P_{i,\psi,t}^{WT} + Q_{i,\psi,t}^{WT} \leq \sqrt{2}\overline{S}_{i,\psi}^{WT} \quad (26)$$

$$-\sqrt{2}\overline{S}_{i,\psi}^{WT} \leq P_{i,\psi,t}^{WT} - Q_{i,\psi,t}^{WT} \leq \sqrt{2}\overline{S}_{i,\psi}^{WT} \quad (27)$$

(1.5) A Demand-Side Responsive Heating Load the output power constraint condition of the demand-side responsive heating load is as follows:

$$\underline{P}_{i,\psi}^{HVAC} \leq P_{i,\psi,t}^{HVAC} \leq \overline{P}_{i,\psi}^{HVAC} \quad (28)$$

$$Q_{i,\psi,t}^{HVAC} = P_{i,\psi,t}^{HVAC} \tan(\varphi_i^{HVAC}) \quad (29)$$

$$P_{i,t}^{HVAC} = \sum_\psi P_{i,\psi,t}^{HVAC} \quad (30)$$

wherein, $P_{i,\psi,t}^{HVAC}$ denotes an active power of the ψ-phase demand-side responsive heating load at node i at moment t; $Q_{i,\psi,t}^{HVAC}$ denotes an inactive power of ψ-phase demand-side responsive heating load at node i at moment t; $\varphi_i^{HVAC}$ denotes a power coefficient of the demand-side responsive heating load at node i at moment t; $\overline{P}_{i,\psi}^{HVAC}$ denotes a maximum active power of ψ-phase demand-side responsive heating load at node i; $\underline{P}_{i,\psi}^{HVAC}$ denotes a minimum active power of the ψ-phase demand-side responsive heating load at node i; and $P_{i,t}^{HVAC}$ denotes a total output active power of the demand-side responsive heating load at node i at moment t.

a temperature constraint of a heating load device is as follows:

$$T_{i,t}^{HVAC}=T_{i,t-1}^{HVAC}+\alpha_i^{HVAC}(T_{i,t}^{ENV}-T_{i,t-1}^{HVAC})+\beta_i^{HVAC}P_{i,t}^{HVAC} \quad (31)$$

$$\underline{T}_i^{HVAC} \leq T_{i,t}^{HVAC} \leq \overline{T}_i^{HVAC} \quad (32)$$

wherein, $T_{i,t}^{HVAC}$ denotes a temperature of the demand-side responsive heating load at node i at moment; $T_{i,t-1}^{HVAC}$ denotes a temperature of the demand-side responsive heating load at node i at moment t−1; $T_{i,t}^{ENV}$ denotes an outdoor temperature of the demand-side responsive heating load at node i at moment t; $\alpha_i^{HVAC}$ denotes a heat dissipation parameter of the demand-side responsive heating load at node i; $\beta_i^{HVAC}$ denotes an electricity-heat conversion parameter of the demand-side responsive heating load at node i; $\underline{T}_i^{HVAC}$ denotes a lower temperature limit of the demand-side responsive heating load at node i; and $\overline{T}_i^{HVAC}$ denotes an upper temperature limit of the demand-side responsive heating load at node i.

(1.6) An Electric Vehicle Charging Station the output power constraint condition of the electric vehicle charging station is as follows:

$$\underline{P}_{i,\psi,t}^{EV} \leq P_{i,\psi,t}^{EV} \leq \overline{P}_{i,\psi,t}^{EV} \quad (33)$$

$$Q_{i,\psi,t}^{EV} = P_{i,\psi,t}^{EV}\tan(\varphi_i^{EV}) \quad (34)$$

$$P_{i,t}^{EV} = \sum_{\psi} P_{i,\psi,t}^{EV} \quad (35)$$

wherein, $P_{i,\psi,t}^{EV}$ denotes an active power of the ψ-phase electric vehicle charging station at node i at moment t; $Q_{i,\psi,t}^{EV}$ denotes an inactive power of the ψ-phase electric vehicle charging station at node i at moment t; $\varphi_i^{EV}$ denotes a power coefficient of the electric vehicle charging station at node i; $\overline{P}_{i,\psi,t}^{EV}$ denotes a maximum active power of the ψ-phase electric vehicle charging station at node i at moment t; $\underline{P}_{i,\psi,t}^{EV}$ denotes a minimum active power of the ψ-phase electric vehicle charging station at node i; and $P_{i,t}^{EV}$ denotes a total output active power of the electric vehicle charging station at node i at moment t.

an energy constraint of the electric vehicle charging station is as follows:

$$\underline{E}_{i,t}^{EV} \leq \sum_{\tau=1}^{t} P_{i,\tau}^{EV} \Delta t \leq \overline{E}_{i,t}^{EV} \quad (36)$$

wherein $\overline{E}_{i,t}^{EV}$ denotes a maximum output energy of the electric vehicle charging station at node i at moment t; and $\underline{E}_{i,t}^{EV}$ denotes a minimum output energy of the electric vehicle charging station at node i at moment t.

(2) Building A Power Flow Model for the Virtual Power Plant Network

Based on a three-phase asymmetrical linear power flow model, each voltage magnitude and each branch current for each node, and an injection active power, and an injection inactive power of a grid entry point in the virtual power plant network are represented as follows:

$$V=Cy+c \quad (37)$$

$$i_{ij}=Dy+d \quad (38)$$

$$p_0=Gy+g \quad (39)$$

$$q_0=Hy+h \quad (40)$$

Wherein, V denotes a vector consisting of a magnitude of each node and each phase voltage; $i_{ij}$ denotes a vector consisting of each branch current; $p_0$ denotes an injection active power of the grid entry point in the virtual power plant; $q_0$ denotes an injection inactive power of the grid entry point in the virtual power plant; matrices C, D, G and H, vectors c and d, and constants g and h are constant parameters of a system; y denotes a vector consisting of the injection power vector, that is, $y:=[(p^Y)^T,(q^Y)^T,(p^\Delta)^T,(q^\Delta)^T]^T$, wherein $p^Y,p^\Delta,q^Y,q^\Delta$ respectively denotes a vector consisting of the injection active power of a Y-type grid entry node, a vector consisting of the injection active power of a Δ-type grid entry node, a vector consisting of an injected inactive power of a Y-type grid entry node, and a vector consisting of an injected inactive power node of a Δ-type grid entry node.

for $\forall i \in N_Y, \psi \in \phi_Y$, the injection power vector of nodes of each type at each moment can be calculated as:

$$p_{i,\psi,t}^Y=P_{i,\psi,t}^{CHP}+P_{i,\psi,t}^{ESS}+P_{i,\psi,t}^{PV}+P_{i,\psi,t}^{WT}-P_{i,\psi,t}^{HVAC}-P_{i,\psi,t}^{EV}-P_{i,\psi,t}^{LOAD} \quad (41)$$

$$q_{i,\psi,t}^Y=Q_{i,\psi,t}^{CHP}+Q_{i,\psi,t}^{ESS}+Q_{i,\psi,t}^{PV}+Q_{i,\psi,t}^{WT}-Q_{i,\psi,t}^{HVAC}-Q_{i,\psi,t}^{EV}-Q_{i,\psi,t}^{LOAD} \quad (42)$$

for $\forall i \in N_\Delta, \psi \in \phi_\Delta$:

$$p_{i,\psi,t}^\Delta=P_{i,\psi,t}^{CHP}+P_{i,\psi,t}^{ESS}+P_{i,\psi,t}^{PV}+P_{i,\psi,t}^{WT}-P_{i,\psi,t}^{HVAC}-P_{i,\psi,t}^{EV}-P_{i,\psi,t}^{LOAD} \quad (43)$$

$$q_{i,\psi,t}^\Delta=Q_{i,\psi,t}^{CHP}+Q_{i,\psi,t}^{ESS}+Q_{i,\psi,t}^{PV}+Q_{i,\psi,t}^{WT}-Q_{i,\psi,t}^{HVAC}-Q_{i,\psi,t}^{EV}-Q_{i,\psi,t}^{LOAD} \quad (44)$$

wherein, $P_{i,\psi,t}^{LOAD}$ denotes an active power of the ψ-phase load at node i at moment t; $Q_{i,\psi,t}^{LOAD}$ denotes an inactive power of the ψ-phase load at node i at moment t; $p_{i,\psi,t}^Y$ denotes an injection active power of the ψ-phase Y-type grid entry node at node i at moment t; $q_{i,\psi,t}^Y$ denotes an injection inactive power of the ψ-phase Y-type grid entry node at node i at moment t; $p_{i,\psi,t}^\Delta$ denotes an injection active power of the ψ-phase Δ-type grid entry node at node i at moment t; $q_{i,\psi,t}^\Delta$ denotes an injection inactive power of the ψ-phase Δ-type grid entry node at node i at moment t; $N_Y$ denotes a set consisting of serial numbers of Y-type grid entry nodes; $N_\Delta$ denotes a set consisting of serial numbers of Δ-type grid entry nodes; $\phi_Y$ denotes a set consisting of phases of Y-type grid entry nodes; and $\phi_\Delta$ denotes a set consisting of phases of Δ-type grid entry nodes.

The network constraint condition of the virtual power plant is as follows:

$$\underline{V} \leq V \leq \overline{V} \quad (45)$$

$$-\overline{i}_{ij} \leq i_{ij} \leq \overline{i}_{ij} \quad (46)$$

Wherein, $\underline{V}$ denotes a vector consisting of a minimum voltage at each phase and each node; $\overline{V}$ denotes a vector consisting of a maximum voltage at each phase and each node; and $\overline{i}_{ij}$ denotes a vector consisting of a maximum current for each branch.

(3) Extracting an Operation Constraint Condition of Energy-Storage-Type and Generator-Type Distributed Resources (3.1) Building Three Types of Decision Variable Vectors defining a decision variable vector consisting of an active output power and an inactive output power of all distributed generation resources as x, a constraint condition consisting of formulas (1)-(5), (7)-(14), (16)-(21), (23)-(38) and (45)-(46) can be represented as a form of a following matrix:

$$Mx \leq n \quad (47)$$

wherein, matrix M and vector n are constant constraint parameters organized based on the constraint condition.

An element x in the decision variable vector can be divided into the following three types: (1) defining all energy storage devices, demand-side responsive heating load and electric vehicle charging stations as energy-storage- type devices, and a decision variable vector consisting of output active power of all energy-storage-type devices as $P_E$; (ii) defining all gas turbines, photovoltaic power generation devices and wind generator devices as generator-type devices, and a decision variable consisting of output active power of all generator-type device as $P_G$; and (iii) defining a decision variable consisting of inactive power of all distributed energy-resource devices as Q. Formula (47) can be rewritten as:

$$M \begin{bmatrix} P_E \\ P_G \\ Q \end{bmatrix} \leq n \quad (48)$$

(3.2) On the Basis of Extracting an Operation Constraint Condition of Distributed Resources of Generator-Type Devices regarding $P_G$ as a random parameter in Robust optimization, a parameter in formula (48) is written in a form of the following block matrix:

$$\begin{bmatrix} 0 & M_{G0} & 0 \\ M_E^E & M_G^E & M_Q^E \end{bmatrix} \begin{bmatrix} P_E \\ P_G \\ Q \end{bmatrix} \leq \begin{bmatrix} n_1^E \\ n_2^E \end{bmatrix} \quad (49)$$

wherein, $M_{G0}$, $M_E^E$, $M_G^E$ and $M_Q^E$ are corresponding blocks in matrix M; and $n_1^E$ and $n_2^E$ are corresponding blocks in vector n.

a constraint relation between parameters $P_G$ in formula (49) and a constraint relation between variables $P_E$, Q and parameters $P_G$ are extracted and represented as formula (50) and formula (51) respectively:

$$M_{G0}P_G \leq n_1^E \quad (50)$$

$$M_E^E P_E + M_Q^E Q \leq n_2^E - M_G^E P_G \quad (51)$$

solution of a Robust optimization problem: for any $P_G$ that satisfies a constraint condition $M_{G0}P_G \leq n_1^E$, a constraint condition of formula (51) is made true constantly, which is equivalent to solution of an optimization problem in formula (52):

$$(M_E^E P_E + M_Q^E Q)_i \leq \min_{P_G}\{(n_2^E - M_G^E P_G)_i | \forall P_G, M_{G0}P_G \leq n_1^E\} \quad (52)$$

wherein, an operator $(\bullet)_i$ denotes elements at $i^{th}$ line of the matrix or vector.

an operation constraint condition of energy-storage-type distributed resources is obtained as follows:

$$E_E x_E \leq f_E \quad (53)$$

wherein, matrix $E_E$ and vector $f_E$ are parameters obtained by solving the Robust optimization problem in formula (52); and $x_E$ is a decision variable of equivalent energy storage, that is:

$$E_E = \begin{bmatrix} M_E^E & M_Q^E \end{bmatrix} \quad (54)$$

$$(f_E)_i = \min_{P_G}\{(n_2^E - M_G^E P_G)_i | \forall P_G, M_{G0}P_G \leq n_1^E\} \quad (55)$$

$$x_E = \begin{bmatrix} P_E \\ Q \end{bmatrix} \quad (56)$$

(3.3) On the Basis of Extracting an Operation Constraint Condition of Distributed Resources of Energy-Storage-Type Devices regarding $P_E$ as a random parameter in Robust optimization, a parameter in formula (48) is written in a form of the following block matrix:

$$\begin{bmatrix} M_{E0} & 0 & 0 \\ M_E^G & M_G^G & M_Q^G \end{bmatrix} \begin{bmatrix} P_E \\ P_G \\ Q \end{bmatrix} \leq \begin{bmatrix} n_1^G \\ n_2^G \end{bmatrix} \quad (57)$$

wherein, $M_{E0}$, $M_E^G$, $M_G^G$ and $M_Q^G$ are corresponding blocks in matrix M; and $n_1^G$ and $n_2^G$ are corresponding blocks in vector n.

a constraint relation between parameters $P_E$ in formula (49) and a constraint relation between variables $P_G$, Q and parameters $P_G$ are extracted and represented as formula (58) and formula (59) respectively:

$$M_{E0}P_E \leq n_1^G \quad (58)$$

$$M_G^G P_G + M_Q^G Q \leq n_2^G - M_E^G P_E \quad (59)$$

solution of a Robust optimization problem: for any $P_E$ that satisfies a constraint condition $M_{E0}P_E \leq n_1^G$, a constraint condition of formula (59) is made true constantly, which is equivalent to solution of an optimization problem in formula (60):

$$(M_G^G P_G + M_Q^G Q)_i \leq \min_{P_E}\{(n_2^G - M_E^G P_E)_i | \forall P_E, M_{E0}P_E \leq n_1^G\} \quad (60)$$

an operation constraint condition of energy-storage-type distributed resources is obtained as follows:

$$E_G x_G \leq f_G \quad (61)$$

wherein, matrix $E_G$ and vector $f_G$ are parameters obtained by solving the Robust optimization problem in formula (60); and $x_G$ is a decision variable of an equivalent generator. that is:

$$E_G = \begin{bmatrix} M_G^G & M_Q^G \end{bmatrix} \quad (62)$$

$$(f_G)_i = \min_{P_E}\{(n_2^G - M_E^G P_E)_i | \forall P_E, M_{E0}P_E \leq n_1^G\} \quad (63)$$

$$x_G = \begin{bmatrix} P_G \\ Q \end{bmatrix} \quad (64)$$

(4) Solving A Constraint Parameter of an Equivalent Energy Storage Device and an Equivalent Generator (4.1) Solving A Constraint Parameter of an Equivalent Energy Storage Device a constraint parameter of an equivalent energy storage device is divided into major problems (65)-(68) and minor problems (72)-(75) to be solved.

the major problems are reflected as the following forms:

$$\max_{b_E} u_E^T b_E \quad (65)$$

$$\text{s.t.} \quad A_E \xi_k^* \geq b_E - M(1 - z_k), \forall k \leq K \quad (66)$$

$$1^T z_k \geq, \forall k \leq K \quad (67)$$

$$z_k \in \{0, 1\}^{n_z}, \forall k \leq K \quad (68)$$

wherein, matrix $A_E$ is a constant matrix denoting upper and lower limits of an output power of equivalent energy storage and a constraint parameter of upper and lower energy limits of energy storage, with a specific form thereof indicated by formula (69); vector $b_E$ denotes an intercept of each high-dimension hyperplane for a polyhedron of a flexible and feasible region; vector $u_E$ is a constant matrix denoting sum of distances for a parallel plane of a flexible and feasible region, with a specific form thereof indicated by formula (70); vector $\xi$ denotes an active power output track of an equivalent energy storage device; matrix $C_E$ and vector $d_E$ are a constant matrix denoting a relation between a decision variable $x_E$ of an equivalent energy storage device and an active power output track $\xi$, with a value thereof obtained by formula (39). K denotes a total number of scenes; $\xi_k^*$ denotes an output active power track of an equivalent energy storage device in a $k^{th}$ scene; $z_k$ denotes a vector of a $k^{th}$ scene consisting of a 0/1 decision variable; $n_z$ denotes a dimensional number of $z_k$; and M denotes a very big constant with a value thereof generally being $1 \times 10^6$.

$$A_E = [I_T - I_T \Gamma^T - \Gamma^T]^T \quad (69)$$

$$u_E = [1_T^T - 1_T^T 1_T^T - 1_T^T]^T \quad (70)$$

wherein, T denotes the number of moments considered; $I_T$ denotes a unit array when a dimensional number is T; $1_T$ denotes a total 1-row vector with T elements; and matrix $\Gamma$ is defined as shown in (71):

$$\Gamma = \begin{bmatrix} \gamma & 0 & \cdots & 0 \\ \gamma^2 & \gamma & \cdots & 0 \\ \vdots & \vdots & \ddots & \vdots \\ \gamma^T & \gamma^{T-1} & \cdots & \gamma \end{bmatrix} \quad (71)$$

wherein, $\gamma$ denotes a self-discharge rate of an equivalent energy storage device.

The minor problems are reflected as the following forms:

$$\min_{\xi} \max_{x_E} 0 \quad (72)$$

$$\text{s.t.} \quad A_E \xi \leq b_E^* \quad (73)$$

$$\xi = C_E x_E + d_E \quad (74)$$

$$E_E x_E \leq f_E \quad (75)$$

Wherein, $b_E^*$ denotes a result obtained by optimization of the major problem.

To facilitate solution, antithetic and KKT conditions are used successively to convert the minor problems (72)-(75) into a mixed integer planning problem shown by formula (76):

$$\min_{\xi, \pi, \lambda, \omega, s} f_E = \lambda^T f_E - \pi^T d_E - \omega^T b_E^* \quad (76)$$

$$\text{s.t.} \quad C_E^T \pi + E_E^T \lambda = 0$$

$$A_E^T \omega + \pi \geq 0$$

$$0 \leq b_E^* - A_E \xi \leq M(1 - s)$$

$$0 \leq \omega \leq Ms$$

$$s \in \{0, 1\}^{n_z}$$

$$\lambda \geq 0$$

Wherein, s denotes a vector consisting of a 0/1 decision variable; $n_s$ denotes a dimensional number of s; $\omega$ denotes an antithetic variable of constraint (73); $\pi$ denotes am antithetic variable of constraint (74); and $\lambda$ denotes an antithetic variable of constraint (75).

A constraint parameter solution algorithm process of an equivalent energy-storage-type device is as follows:
a. initializing: allowing K=0;
b. solving the major problems (65)-(68), thereby obtaining an optimal solution $b_E^*$;
c. based on the optimal solution $b_E^*$, solving an equivalence problem (76) of the minor problem, thereby obtaining an optimal solution $\xi_{K+1}^*$ and a target function value $f(_E)$;
d. if $f_E^* < 1 \times 10^{-6}$ meets, ending algorithm with $b_E^*$ as a final solution result; otherwise, adding following constraint condition (77)-(79) to the major problem and allowing K←K+1, and returning to the step b;

$$A_E \xi_{K+1}^* \geq b_E - M(1 - z_{K+1}) \quad (77)$$

$$1^T z_{K+1} \geq 1 \quad (78)$$

$$z_{K+1} \in \{0, 1\}^{n_z} \quad (79)$$

(4.2) Solving A Constraint Parameter of an Equivalent Generator a constraint parameter of an equivalent generator is divided into major problems (80)-(83) and minor problems (87)-(90) to be solved.

the major problems are reflected as the following forms:

$$\max_{b_G} u_G^T b_G \quad (80)$$

$$\text{s.t.} \quad A_G \xi_k^* \geq b_G - M(1 - z_k), \forall k \leq K \quad (81)$$

$$1^T z_k \geq 1, \forall k \leq K \quad (82)$$

$$z_k \in \{0, 1\}^{n_z}, \forall k \leq K \quad (83)$$

wherein, matrix $A_G$ is a constant matrix denoting upper and lower limits of an output power of an equivalent generator and a constraint parameter of upper and lower climbing limits, with a specific form thereof indicated by formula (84); vector $b_G$ denotes an intercept of each high-dimension hyperplane for a polyhedron of a flexible and feasible region; vector $u_G$ is a constant matrix denoting sum of distances for a parallel plane of a flexible and feasible region, with a specific form thereof indicated by formula (85); $\xi$ denotes an active power output track of an equivalent generator; matrix $C_G$ and vector $d_G$ are a constant matrix denoting a relation between a decision variable $x_G$ of an equivalent generator and an active power output track $\xi$, with a value thereof obtained by formula (39).

$$A_G = [I_T - I_T \Lambda^T - \Lambda^T]^T \tag{84}$$

$$u_G = [1_T^T - 1_T^T 1_{T-1}^T - 1_{T-1}^T]^T \tag{85}$$

wherein, $1_{T-1}$ denotes a total 1-row vector with T−1 elements; and matrix $\Lambda$ is a matrix having a size of (T−1)× T, which is defined as shown in (86):

$$\Lambda = \begin{bmatrix} -1 & 1 & 0 & \cdots & 0 \\ 0 & -1 & 1 & \cdots & 0 \\ \vdots & \vdots & \ddots & \ddots & \vdots \\ 0 & 0 & \cdots & -1 & 1 \end{bmatrix} \tag{86}$$

the minor problems are reflected as the following forms:

$$\min_{\xi} \max_{x_G} 0 \tag{87}$$

$$\text{s.t. } A_G \xi \leq b_G^* \tag{88}$$

$$\xi = C_G x_G + d_G \tag{89}$$

$$E_G x_G \leq f_G \tag{90}$$

wherein, $b^*_G$ denotes a result obtained by optimization of the major problem.

To facilitate solution, antithetic and KKT conditions are used successively to convert the minor problems (87)-(90) into a mixed integer planning problem shown by formula (91):

$$\min_{\xi,\pi,\lambda,\omega,s} f_G = \lambda^T f_G - \pi^T d_G - \omega^T b_G^* \tag{91}$$

$$\text{s.t. } C_G^T \pi + E_G^T \lambda = 0$$

$$A_G^T \omega + \pi \geq 0$$

$$0 \leq b_G^* - A_G \xi \leq M(1-s)$$

$$0 \leq \omega \leq Ms$$

$$s \in \{0, 1\}^{n_z}$$

$$\lambda \geq 0$$

Wherein, $\omega$ denotes an antithetic variable of constraint (88); $\pi$ denotes am antithetic variable of constraint (89); and $\lambda$ denotes an antithetic variable of constraint (90).

A constraint parameter solution algorithm process of an equivalent energy storage device is as follows:

a. initializing: allowing K=0;

b. solving the major problems (80)-(83), thereby obtaining an optimal solution $b^*_G$;

c. based on the optimal solution $b^*_G$, solving an equivalence problem (76) of the minor problem, thereby obtaining an optimal solution $\xi^*_{K+1}$ and a target function value $f^*_G$;

d. if $f^*_G < 1 \times 10^{-6}$ meets, ending algorithm with $b^*_G$ as a final solution result; otherwise, adding following constraint condition (92)-(94) to the major problem and allowing K←K+1, and returning to the step b;

$$A_G \xi^*_{K+1} \geq b_G - M(1 - z_{K+1}) \tag{92}$$

$$1^T z_{K+1} \geq 1 \tag{93}$$

$$z_{K+1} \in \{0, 1\}^{n_z} \tag{94}$$

(5) Obtaining An Assessment Result of Flexibility for the Virtual Power Plant

An assessment result of flexibility for the virtual power plant is obtained based on the result in the step (4), that is, a virtual power plant can be equaled to an equivalent energy-storage-type device and an equivalent generator-type device, and flexibility ranges of the two types of device are respectively shown in formula (95) and formula (96). An output active power of the virtual power plant is denoted in a form of formula (97).

$$A_E P_{ESS} \leq b^*_E \tag{95}$$

$$A_G P_{GEN} \leq b^*_G \tag{96}$$

$$P_{VPP} = P_{ESS} + P_{GEN} \tag{97}$$

Wherein, $P_{ESS}$ denotes a vector consisting of an output active power of equivalent energy-storage-type devices at each moment; $P_{GEN}$ denotes a vector consisting of an output active power of equivalent generator-type devices at each moment; and $P_{VPP}$ denotes a vector consisting an output active power of a virtual power plant at each moment.

Although the present invention is described in detail with reference to the foregoing embodiments, persons of ordinary skill in the art should understand that they may still make modifications to the technical solutions described in the foregoing embodiments or make equivalent replacements to some technical features thereof. These modifications or replacements do not enable the essence of the corresponding technical solutions to depart from the spirit and scope of the technical solutions of the embodiments of the present invention.

The invention claimed is:

1. A method of optimizing dynamic flexibility for a virtual power plant within a power distribution system, the virtual power plant comprising a plurality of physical resources in an electrical grid that are networked to provide a virtual power plant network, characterized in that the method comprises the following steps:

A. setting an output power constraint condition for each of the plurality of physical resources, the plurality of physical resources including at least one of a gas turbine, an energy storage device, a photovoltaic power generation device, a wind generator device, a demand-side responsive heating load and an electric vehicle charging station, and building a distributed energy-resource model of a virtual power plant;

B. setting a voltage magnitude, a current and an injection power in the virtual power plant network, thereby obtaining a network constraint condition of the virtual power plant, and building a power flow model for the virtual power plant network;

C. defining the energy storage device, the demand-side responsive heating load and the electric vehicle charging station as energy-storage-type devices; defining the gas turbine, the photovoltaic power generation device and the wind generator device as generator-type devices; defining a decision variable vector consisting of output power of all distributed generation energy and resources, wherein a decision variable consisting of output active power of all energy-storage-type devices of the plurality of physical resources is $P_E$, a decision variable consisting of output active power of all generator-type devices of the plurality of physical resources is $P_G$, and a decision variable Q consisting of inactive power of the plurality of physical resources is defined; and extracting an operation constraint condition of energy-storage-type and generator-type distributed resources based on a Robust optimization method;

D. generating models of the plurality of physical resources, the models including equivalents of the energy-storage-type devices and equivalents of the generator-type devices and solving a constraint parameter respectively for the equivalent energy-storage-type devices and the equivalent generator-type devices based on a two-stage robust optimization algorithm according to a parameter in the distributed energy-resource model for the virtual power plant in the step A, a parameter of the power flow model for the virtual power plant network in the step B, and the operation constraint condition of energy-storage-type and generator-type distributed resources in the step C; and E. obtaining an assessment result of flexibility for the virtual power plant based on the generated model and the constraint parameter in the step D, and F. applying the assessment result to control the plurality of physical resources for optimized scheduling and grid resource participation.

2. The method of assessing dynamic flexibility for a virtual power plant as claimed in claim 1, characterized in that
the output power constraint condition of the gas turbine in the step A is:

$$\underline{P}_{i,\psi}^{CHP} \leq P_{i,\psi,t}^{CHP} \leq \overline{P}_{i,\psi}^{CHP} \tag{1}$$

$$\underline{Q}_{i,\psi}^{CHP} \leq Q_{i,\psi,t}^{CHP} \leq \overline{Q}_{i,\psi}^{CHP} \tag{2}$$

$$P_{i,t}^{CHP} = \sum_{\psi} P_{i,\psi,t}^{CHP} \tag{3}$$

wherein $P_{i,\psi,t}^{CHP}$ denotes an output active power of the $\psi$-phase gas turbine at node i at moment t; $Q_{i,\psi,t}^{CHP}$ denotes an output inactive power of the $\psi$-phase gas turbine at node i at moment t; $\overline{P}_{i,\psi}^{CHP}$ denotes a maximum output active power of the $\psi$-phase gas turbine at node i; $\underline{P}_{i,\psi}^{CHP}$ denotes a minimum output active power of the $\psi$-phase gas turbine at node i; $\overline{Q}_{i,\psi}^{CHP}$ denotes a maximum output inactive power of the $\psi$-phase gas turbine at node i; $\underline{Q}_{i,\psi}^{CHP}$ denotes a minimum output inactive power of the $\psi$-phase gas turbine at node i; and $P_{i,t}^{CHP}$ denotes an output active power of the gas turbine at node i at moment t;

a climbing constraint condition of an active power of the gas turbine is as follows:

$$-r_i^{CHP} \leq P_{i,t}^{CHP} - P_{i,t-1}^{CHP} \leq r_i^{CHP} \tag{4}$$

wherein $r_i^{CHP}$ denotes a climbing parameter of the gas turbine at node i and $P_{i,t-1}^{CHP}$ denotes an output active power of the $\psi$-phase gas turbine at node i at moment t−1.

3. The method of assessing dynamic flexibility for a virtual power plant as claimed in claim 1, characterized in that
the output power constraint condition of the energy storage device in the step A is:

$$-\overline{P}_{i,\psi}^{ch} \leq P_{i,\psi,t}^{ESS} \leq \overline{P}_{i,\psi}^{dc} \tag{5}$$

$$(P_{i,\psi,t}^{ESS})^2 + (Q_{i,\psi,t}^{ESS})^2 \leq (\overline{S}_{i,\psi}^{ESS})^2 \tag{6}$$

$$P_{i,t}^{ESS} = \sum_{\psi} P_{i,\psi,t}^{ESS} \tag{7}$$

wherein $P_{i,\psi,t}^{ESS}$ denotes a net output active power of the $\psi$-phase energy storage device at node i at moment t; $Q_{i,\psi,t}^{ESS}$ denotes a net output inactive power of the $\psi$-phase energy storage device at node i at moment t; $\overline{P}_{i,\psi}^{dc}$ denotes a maximum discharging active power of the $\psi$-phase energy storage device at node i; $\overline{P}_{i,\psi}^{ch}$ denotes a maximum charging active power of the $\psi$-phase energy storage device at node i; $\overline{S}_{i,\psi}^{ESS}$ denotes a maximum capacity of the $\psi$-phase energy storage device at node i; and $P_{i,t}^{ESS}$ denotes a net output active power of the energy storage device at node i at moment t;

formula (6) approximates the following linear formula:

$$-\overline{S}_{i,\psi}^{ESS} \leq P_{i,\psi,t}^{ESS} \leq \overline{S}_{i,\psi}^{ESS} \tag{8}$$

$$-\overline{S}_{i,\psi}^{ESS} \leq Q_{i,\psi,t}^{ESS} \leq \overline{S}_{i,\psi}^{ESS} \tag{9}$$

$$-\sqrt{2}\overline{S}_{i,\psi}^{ESS} \leq P_{i,\psi,t}^{ESS} + Q_{i,\psi,t}^{ESS} \leq \sqrt{2}\overline{S}_{i,\psi}^{ESS} \tag{10}$$

$$-\sqrt{2}\overline{S}_{i,\psi}^{ESS} \leq P_{i,\psi,t}^{ESS} - Q_{i,\psi,t}^{ESS} \leq \sqrt{2}\overline{S}_{i,\psi}^{ESS} \tag{11}$$

an energy constraint condition of the energy storage device is:

$$\underline{E}_i^{ESS} \leq E_{i,t}^{ESS} \leq \overline{E}_i^{ESS} \tag{12}$$

$$E_{i,t}^{ESS} = \alpha_i^{ESS} E_{i,t-1}^{ESS} + P_{i,t}^{ESS} \Delta t \tag{13}$$

wherein $E_{i,t}^{ESS}$ denotes energy of the energy storage device at moment t at node i; $E_{i,t-1}^{ESS}$ denotes energy of the energy storage device at moment t−1 at node i; $\underline{E}_i^{ESS}$ denotes minimum energy of the energy storage device at node i; $\overline{E}_i^{ESS}$ denotes maximum energy of the energy storage device at node i; $\alpha_i^{ESS}$ denotes a self-discharge rate of the energy storage device at node i; and $\Delta t$ denotes a time interval of two decision moments.

4. The method of assessing dynamic flexibility for a virtual power plant as claimed in claim 1, characterized in that the output power constraint condition of the photovoltaic power generation device in the step A is:

$$\underline{P}_{i,\psi}^{PV} \leq P_{i,\psi,t}^{PV} \leq \overline{P}_{i,\psi}^{PV} \tag{14}$$

$$(P_{i,\psi,t}^{PV})^2 + (Q_{i,\psi,t}^{PV})^2 \leq (\overline{S}_{i,\psi}^{PV})^2 \tag{15}$$

$$P_{i,t}^{PV} = \sum_{\psi} P_{i,\psi,t}^{PV} \tag{16}$$

wherein $P_{i,\psi,t}^{PV}$ denotes an output active power of the $\psi$-phase photovoltaic power generation device at node i at moment t; $Q_{i,\psi,t}^{PV}$ denotes an output inactive power of the $\psi$-phase photovoltaic power generation device at node i at moment t; $\underline{P}_{i,\psi}^{PV}$ denotes a minimum output active power of the $\psi$-phase photovoltaic power generation device at node i; $\overline{P}_{i,\psi}^{PV}$ denotes a maximum output active power of the $\psi$-phase photovoltaic power generation device at node i; $\overline{S}_{i,\psi}^{PV}$ denotes a maximum capacity of the $\psi$-phase photovoltaic power generation device at node i; and $P_{i,t}^{PV}$ denotes a total output active power of the photovoltaic power generation device at node i at moment t;
formula (15) approximates the following linear formula:

$$-\overline{S}_{i,\psi}^{PV} \leq P_{i,\psi,t}^{PV} \leq \overline{S}_{i,\psi}^{PV} \quad (17)$$

$$-\overline{S}_{i,\psi}^{PV} \leq Q_{i,\psi,t}^{PV} \leq \overline{S}_{i,\psi}^{PV} \quad (18)$$

$$-\sqrt{2}\overline{S}_{i,\psi}^{PV} \leq P_{i,\psi,t}^{PV} + Q_{i,\psi,t}^{PV} \leq \sqrt{2}\overline{S}_{i,\psi}^{PV} \quad (19)$$

$$-\sqrt{2}\overline{S}_{i,\psi}^{PV} \leq P_{i,\psi,t}^{PV} - Q_{i,\psi,t}^{PV} \leq \sqrt{2}\overline{S}_{i,\psi}^{PV} \quad (20).$$

5. The method of assessing dynamic flexibility for a virtual power plant as claimed in claim 1, characterized in that the output power constraint condition of the wind generator device in the step A is:

$$\underline{P}_{i,\psi,t}^{WT} \leq P_{i,\psi,t}^{WT} \leq \overline{P}_{i,\psi}^{WT} \quad (21)$$

$$(P_{i,\psi,t}^{WT})^2 + (Q_{i,\psi,t}^{WT})^2 \leq (\overline{S}_{i,\psi}^{WT})^2 \quad (22)$$

$$P_{i,t}^{WT} = \sum_{\psi} P_{i,\psi,t}^{WT} \quad (23)$$

wherein $P_{i,\psi,t}^{WT}$ denotes an output active power of the $\psi$-phase wind generator at node i at moment t; $Q_{i,\psi,t}^{WT}$ denotes an output inactive power of the $\psi$-phase wind generator at node i at moment t; $\underline{P}_{i,\psi}^{WT}$ denotes a minimum output active power of the $\psi$-phase wind generator at node i; $\overline{P}_{i,\psi}^{WT}$ denotes a maximum output active power of the $\psi$-phase wind generator at node i; $\overline{S}_{i,\psi}^{WT}$ denotes a maximum capacity of the $\psi$-phase wind generator at node i; and $P_{i,t}^{WT}$ denotes a total output active power of the wind generator at node i at moment t;
formula (22) approximates the following linear formula:

$$-\overline{S}_{i,\psi}^{WT} \leq P_{i,\psi,t}^{WT} \leq \overline{S}_{i,\psi}^{WT} \quad (24)$$

$$-\overline{S}_{i,\psi}^{WT} \leq Q_{i,\psi,t}^{WT} \leq \overline{S}_{i,\psi}^{WT} \quad (25)$$

$$-\sqrt{2}\overline{S}_{i,\psi}^{WT} \leq P_{i,\psi,t}^{WT} + Q_{i,\psi,t}^{WT} \leq \sqrt{2}\overline{S}_{i,\psi}^{WT} \quad (26)$$

$$-\sqrt{2}\overline{S}_{i,\psi}^{WT} \leq P_{i,\psi,t}^{WT} - Q_{i,\psi,t}^{WT} \leq \sqrt{2}\overline{S}_{i,\psi}^{WT} \quad (27).$$

6. The method of assessing dynamic flexibility for a virtual power plant as claimed in claim 1, characterized in that the output power constraint condition of the demand-side responsive heating load in the step A is:

$$\underline{P}_{i,\psi}^{HVAC} \leq P_{i,\psi,t}^{HVAC} \leq \overline{P}_{i,\psi}^{HVAC} \quad (28)$$

$$Q_{i,\psi,t}^{HVAC} = P_{i,\psi,t}^{HVAC} \tan(\varphi_i^{HVAC}) \quad (29)$$

$$P_{i,t}^{HVAC} = \sum_{\psi} P_{i,\psi,t}^{HVAC} \quad (30)$$

wherein $P_{i,\psi,t}^{HVAC}$ denotes an active power of the $\psi$-phase demand-side responsive heating load at node i at moment t; $Q_{i,\psi,t}^{HVAC}$ denotes an inactive power of the $\psi$-phase demand-side responsive heating load at node i at moment t; $\varphi_i^{HVAC}$ denotes a power coefficient of the demand-side responsive heating load at node i; $\overline{P}_{i,\psi}^{HVAC}$ denotes a maximum active power of the $\psi$-phase demand-side responsive heating load at node i; $\underline{P}_{i,\psi}^{HVAC}$ denotes a minimum active power of the $\psi$-phase demand-side responsive heating load at node i; and $P_{i,t}^{HVAC}$ denotes a total output active power of the demand-side responsive heating load at node i at moment t;
a temperature constraint of a heating load device is as follows:

$$T_{i,t}^{HVAC} = T_{i,t-1}^{HVAC} + \alpha_i^{HVAC}(T_{i,t}^{ENV} - T_{i,t-1}^{HVAC}) + \beta_i^{HVAC} P_{i,t}^{HVAC} \quad (31)$$

$$\underline{T}_i^{HVAC} \leq T_{i,t}^{HVAC} \leq \overline{T}_i^{HVAC} \quad (32)$$

wherein $T_{i,t}^{HVAC}$ denotes a temperature of the demand-side responsive heating load at node i at moment t; $T_{i,t-1}^{HVAC}$ denotes a temperature of the demand-side responsive heating load at node i at moment t−1; $T_{i,t}^{ENV}$ denotes an outdoor temperature of the demand-side responsive heating load at node i at moment t; $\alpha_i^{HVAC}$ denotes a heat dissipation parameter of the demand-side responsive heating load at node i; $\beta_i^{HVAC}$ denotes an electricity-heat conversion parameter of the demand-side responsive heating load at node i; $\underline{T}_i^{HVAC}$ denotes a lower temperature limit of the demand-side responsive heating load at node i; and $\overline{T}_i^{HVAC}$ denotes an upper temperature limit of the demand-side responsive heating load at node i.

7. The method of assessing dynamic flexibility for a virtual power plant as claimed in claim 1, characterized in that the output power constraint condition of the electric vehicle charging station in the step A is:

$$\underline{P}_{i,\psi,t}^{EV} \leq P_{i,\psi,t}^{EV} \leq \overline{P}_{i,\psi,t}^{EV} \quad (33)$$

$$Q_{i,\psi,t}^{EV} = P_{i,\psi,t}^{EV} \tan(\varphi_i^{EV}) \quad (34)$$

$$P_{i,t}^{EV} = \sum_{\psi} P_{i,\psi,t}^{EV} \quad (35)$$

wherein $P_{i,\psi,t}^{EV}$ denotes an active power of the $\psi$-phase electric vehicle charging station at node i at moment t; $Q_{i,\psi,t}^{EV}$ denotes an inactive power of the $\psi$-phase electric vehicle charging station at node i at moment t; $\varphi_i^{EV}$ denotes a power coefficient of the electric vehicle charging station at node i; $\overline{P}_{i,\psi,t}^{EV}$ denotes a maximum active power of the $\psi$-phase electric vehicle charging station at node i at moment t; $\underline{P}_{i,\psi,t}^{EV}$ denotes a minimum active power of the $\psi$-phase electric vehicle charging station at node i; and $P_{i,t}^{EV}$ denotes a total output active power of the electric vehicle charging station at node i at moment t;
an energy constraint of the electric vehicle charging station is:

$$\underline{E}_{i,t}^{EV} \leq \sum_{\tau=1}^{t} P_{i,t}^{EV} \Delta t \leq \overline{E}_{i,t}^{EV} \quad (36)$$

wherein $\overline{E}_{i,t}^{EV}$ denotes a maximum output energy of the electric vehicle charging station at node i at moment t; and $\underline{E}_{i,t}^{EV}$ denotes a minimum output energy of the electric vehicle charging station at node i at moment t; and $\Delta t$ denotes a time interval of two decision moments.

8. The method of assessing dynamic flexibility for a virtual power plant as claimed in claim 1, characterized in that each voltage magnitude and each branch current for each node, and an injection active power, and an injection inactive power of a grid entry point in the virtual power plant network in the step B are represented as:

$$V = Cy + c \quad (37)$$

$$i_{ij} = Dy + d \quad (38)$$

$$p_0 = Gy + g \quad (39)$$

$$q_0 = Hy + h \quad (40)$$

wherein V denotes a vector consisting of a magnitude of each node and each phase voltage; $i_{ij}$ denotes a vector consisting of each branch current; $p_0$ denotes an injection active power of the grid entry point in the virtual power plant; $q_0$ denotes an injection inactive power of the grid entry point in the virtual power plant; matrices C, D, G and H, vectors c and d, and constants g and h are constant parameters of a system; y denotes a vector consisting of the injection power vector, that is, $y := [(p^Y)^T, (q^Y)^T, (p^\Delta)^T, (q^\Delta)^T]^T$, wherein $p^Y, p^\Delta, q^Y, q^\Delta$ respectively denotes a vector consisting of the injection active power of a Y-type grid entry node, a vector consisting of the injection active power of a $\Delta$-type grid entry node, a vector consisting of an injected inactive power of a Y-type grid entry node, and a vector consisting of an injected inactive power node of a $\Delta$-type grid entry node;

for $\forall i \in N_Y$, $\psi \in \phi_Y$, the injection power vector of nodes of each type at each moment can be calculated as:

$$p_{i,\psi,t}^Y = P_{i,\psi,t}^{CHP} + P_{i,\psi,t}^{ESS} + P_{i,\psi,t}^{PV} + P_{i,\psi,t}^{WT} - P_{i,\psi,t}^{HVAC} - P_{i,\psi,t}^{EV} - P_{i,\psi,t}^{LOAD} \quad (41)$$

$$q_{i,\psi,t}^Y = Q_{i,\psi,t}^{CHP} + Q_{i,\psi,t}^{ESS} + Q_{i,\psi,t}^{PV} + Q_{i,\psi,t}^{WT} - Q_{i,\psi,t}^{HVAC} - Q_{i,\psi,t}^{EV} - Q_{i,\psi,t}^{LOAD} \quad (42)$$

for $\forall i \in N_\Delta$, $\psi \in \phi_\Delta$, the injection power vector of nodes of each type at each moment can be calculated as:

$$p_{i,\psi,t}^\Delta = P_{i,\psi,t}^{CHP} + P_{i,\psi,t}^{ESS} + P_{i,\psi,t}^{PV} + P_{i,\psi,t}^{WT} - P_{i,\psi,t}^{HVAC} - P_{i,\psi,t}^{EV} - P_{i,\psi,t}^{LOAD} \quad (43)$$

$$q_{i,\psi,t}^\Delta = Q_{i,\psi,t}^{CHP} + Q_{i,\psi,t}^{ESS} + Q_{i,\psi,t}^{PV} + Q_{i,\psi,t}^{WT} - Q_{i,\psi,t}^{HVAC} - Q_{i,\psi,t}^{EV} - Q_{i,\psi,t}^{LOAD} \quad (44)$$

wherein $P_{i,\psi,t}^{CHP}$ denotes an output active power of the $\psi$-phase gas turbine at node i at moment t; $Q_{i,\psi,t}^{CHP}$ denotes an output inactive power of the $\psi$-phase gas turbine at node i at moment t; $P_{i,\psi,t}^{CHP}$ denotes a net active output power of the $\psi$-phase energy storage device at node i at moment t; $Q_{i,\psi,t}^{ESS}$ denotes a net inactive output power of the $\psi$-phase energy storage device at node i at moment t; $P_{i,\psi,t}^{PV}$ denotes an active output power of the $\psi$-phase photovoltaic power generation device at node i at moment t; $Q_{i,\psi,t}^{PV}$ denotes an inactive output power of the $\psi$-phase photovoltaic power generation device at node i at moment t; $P_{i,\psi,t}^{WT}$ denotes an active output power of the $\psi$-phase wind generator at node i at moment t; $Q_{i,\psi,t}^{WT}$ denotes an inactive output power of the $\psi$-phase wind generator at node i at moment t; $P_{i,\psi,t}^{HVAC}$ denotes an active power of the $\psi$-phase demand-side responsive heating load at node i at moment t; $Q_{i,\psi,t}^{HVAC}$ denotes an inactive power of the $\psi$-phase demand-side responsive heating load at node i at moment t; $P_{i,\psi,t}^{EV}$ denotes an active power of the $\psi$-phase electric vehicle charging station at node i at moment t; $Q_{i,\psi,t}^{EV}$ denotes an inactive power of the $\psi$-phase electric vehicle charging station at node i at moment t; $P_{i,\psi,t}^{LOAD}$ denotes an active power of the $\psi$-phase load at node i at moment t; $Q_{i,\psi,t}^{LOAD}$ denotes an inactive power of the $\psi$-phase load at node i at moment t; $p_{i,\psi,t}^Y$ denotes an injection active power of the $\psi$-phase Y-type grid entry node at node i at moment t; $q_{i,\psi,t}^Y$ denotes an injection inactive power of the $\psi$-phase Y-type grid entry node at node i at moment t; $p_{i,\psi,t}^\Delta$ denotes an injection active power of the $\psi$-phase $\Delta$-type grid entry node at node i at moment t; $q_{i,\psi,t}^\Delta$ denotes an injection inactive power of the $\psi$-phase $\Delta$-type grid entry node at node i at moment t; $N_Y$ denotes a set consisting of serial numbers of Y-type grid entry nodes; $N_\Delta$ denotes a set consisting of serial numbers of $\Delta$-type grid entry nodes; $\phi_Y$ denotes a set consisting of phases of Y-type grid entry nodes; and $\phi_\Delta$ denotes a set consisting of phases of $\Delta$-type grid entry nodes.

9. The method of assessing dynamic flexibility for a virtual power plant as claimed in claim 8, characterized in that the network constraint condition of the virtual power plant is:

$$\underline{V} \leq V \leq \overline{V} \quad (45)$$

$$-\overline{i}_{ij} \leq i_{ij} \leq \overline{i}_{ij} \quad (46)$$

wherein $\underline{V}$ denotes a vector consisting of a minimum voltage at each phase and each node; $\overline{V}$ denotes a vector consisting of a maximum voltage at each phase and each node; and $\overline{i}_{ij}$ denotes a vector consisting of a maximum current for each branch.

10. The method of assessing dynamic flexibility for a virtual power plant as claimed in claim 1, characterized in that in the step C, a constraint condition consisting of formulas (1)-(5), (7)-(14), (16)-(21), (23)-(28) and (45)-(46) is represented as:

$$M \begin{bmatrix} P_E \\ P_G \\ Q \end{bmatrix} \leq n \quad (47)$$

wherein matrix M and vector n are constant constraint parameters organized based on the constraint condition.

11. The method of assessing dynamic flexibility for a virtual power plant as claimed in claim 10, characterized in that regarding $P_G$ as a random parameter in Robust optimization, a parameter in formula (47) is written in a form of a block matrix:

$$\begin{bmatrix} 0 & M_{G0} & 0 \\ M_E^E & M_G^E & M_Q^E \end{bmatrix} \begin{bmatrix} P_E \\ P_G \\ Q \end{bmatrix} \leq \begin{bmatrix} n_1^E \\ n_2^E \end{bmatrix} \quad (48)$$

wherein $M_{G0}$, $M_E^E$, $M_G^E$ and $M_Q^E$ are corresponding blocks in matrix M; and $n_1^E$ and $n_2^E$ are corresponding blocks in vector n;

a constraint relation between parameters $P_G$ in formula (48) and a constraint relationship between variables $P_E$, Q and parameters $P_G$ are extracted and respectively represented as:

$$M_{G0} P_G \leq n_1^E \quad (49)$$

$$M_E^E P_E + M_Q^E Q \leq n_2^E - M_G^E P_G \quad (50)$$

solution of a Robust optimization problem: for any $P_G$ that satisfies a constraint condition $M_{G0} P_G \leq n_1^E$, a constraint condition of formula (50) is made true constantly, which is equivalent to solution of an optimization problem in formula (51);

$$(M_E^E P_E + M_Q^E Q)_i \leq \min_{P_G} \{(n_2^E - M_G^E P_G)_i \mid \forall P_G, M_{G0} P_G \leq n_1^E\} \quad (51)$$

wherein an operator $(\bullet)_i$ denotes elements at $i^{th}$ line of the matrix or vector;

an operation constraint condition of energy-storage-type distributed resources is obtained as:

$$E_E x_E \leq f_E \quad (52)$$

wherein matrix $E_E$ and vector $f_E$ are parameters obtained by solving the Robust optimization problem in formula (51); and $x_E$ is a decision variable of equivalent energy storage, that is:

$$E_E = [M_E^E \ M_Q^E] \quad (53)$$

$$(f_E)_i = \min_{P_G}\{(n_2^E - M_G^E P_G)_i \mid \forall P_G, M_{G0}P_G \leq n_1^E\} \quad (54)$$

$$x_E = \begin{bmatrix} P_E \\ Q \end{bmatrix}. \quad (55)$$

12. The method of assessing dynamic flexibility for a virtual power plant as claimed in claim 10, characterized in that regarding $P_E$ as a random parameter in Robust optimization, a parameter in formula (47) is written in a form of a block matrix:

$$\begin{bmatrix} M_{E0} & 0 & 0 \\ M_E^G & M_G^G & M_Q^G \end{bmatrix} \begin{bmatrix} P_E \\ P_G \\ Q \end{bmatrix} \leq \begin{bmatrix} n_1^G \\ n_2^G \end{bmatrix} \quad (56)$$

wherein $M_{G0}$, $M_E^G$, $M_G^G$ and $M_Q^G$ are corresponding blocks in matrix M; and $n_1^G$ and $n_2^G$ are corresponding blocks in vector n;

a constraint relation between parameters $P_E$ in formula (47) and a constraint relation between variables $P_G$, Q and parameters $P_G$ are extracted and represented as:

$$M_{E0} P_E \leq n_1^G \quad (57)$$

$$M_G^G P_G + M_Q^G Q \leq n_2^G - M_E^G P_E \quad (58)$$

solution of a Robust optimization problem: for any $P_E$ that satisfies a constraint condition $M_{E0}P_E \leq n_1^G$, a constraint condition of formula (58) is made true constantly, which is equivalent to solution of an optimization problem in formula (59);

$$(M_G^G P_G + M_Q^G Q)_i \leq \min_{P_E}\{(n_2^G - M_E^G P_E)_i \mid \forall P_E, M_{E0}P_E \leq n_1^G\} \quad (59)$$

an operation constraint condition of generator-type distributed resources is obtained as:

$$E_G x_G \leq f_G \quad (60)$$

wherein matrix $E_G$ and vector $f_G$ are parameters obtained by solving the Robust optimization problem in formula (59); and $x_G$ is a decision variable of an equivalent generator, that is:

$$E_G = [M_G^G \ M_Q^G] \quad (61)$$

$$(f_G)_i = \min_{P_E}\{(n_2^G - M_E^G P_E)_i \mid \forall P_E, M_{E0}P_E \leq n_1^G\} \quad (62)$$

$$x_G = \begin{bmatrix} P_G \\ Q \end{bmatrix}. \quad (63)$$

13. The method of assessing dynamic flexibility for a virtual power plant as claimed in claim 1, characterized in that a constraint parameter for equivalent energy-storage-type devices in the step D is divided into a major problem and a minor problem to be solved, the major problem is reflected as:

$$\max_{b_E} u_E^T b_E \quad (64)$$

$$\text{s.t. } A_E \xi_k^* \geq b_E - M(1 - z_k), \forall k \leq K \quad (65)$$

$$1^* z_k \geq 1, \forall k \leq K \quad (66)$$

$$z_k \in \{0, 1\}^{n_z}, \forall k \leq K \quad (67)$$

wherein matrix $A_E$ is a constant matrix denoting upper and lower limits of an output power of equivalent energy storage and a constraint parameter of upper and lower energy limits of energy storage; vector $b_E$ denotes an intercept of each high-dimension hyperplane for a polyhedron of a flexible and feasible region; vector $u_E$ denotes a constant matrix of sum of distances for a parallel plane of a flexible and feasible region; K denotes a total number of scenes; $\xi^*_k$ denotes an active output power track of an equivalent energy-storage-type device in a $k^{th}$ scene; $z_k$ denotes a vector of a $k^{th}$ scene consisting of a 0/1 decision variable; $n_z$ denotes a dimensional number of $z_k$; and M denotes a very big constant with a value thereof generally being $1 \times 10^6$;

the minor problem is reflected as:

$$\min_{\xi} \max_{x_E} 0 \quad (68)$$

$$\text{s.t. } A_E \xi \leq b_E^* \quad (69)$$

$$\xi = C_E x_E + d_E \quad (70)$$

$$E_E x_E \leq f_E \quad (71)$$

wherein $b^*_E$ denotes a result obtained by optimization of the major problem; matrix $C_E$ and vector $d_E$ are a constant matrix denoting a relationship between a decision variable $x_E$ of an equivalent energy-storage-type device and an active power output track $\xi$; matrix $E_E$ and vector $f_E$ are parameters obtained by solving the Robust optimization problem in formula (51);

to facilitate solution, antithetic and KKT conditions are used successively to convert the minor problem into a mixed integer planning problem in formula (72):

$$\min_{\xi, \pi, k, \omega, s} f_E = \lambda^T f_E - \pi^T d_\varepsilon - \omega^T b_E^* \quad (72)$$

$$\text{s.t. } C_E^T \pi + E_E^T \lambda = 0$$

$$A_E^T \omega + \pi \geq 0$$

-continued $$0 \le b_E^* - A_E\xi \le M(1-s)$$

$$0 \le \omega \le Ms$$

$$s \in \{0, 1\}^{n_s}$$

$$\lambda \ge 0$$

wherein s denotes a vector consisting of a 0/1 decision variable; $n_s$ denotes a dimensional number of s; ω denotes an antithetic variable of constraint (69); π denotes am antithetic variable of constraint (70); and λ denotes an antithetic variable of constraint (71).

14. The method of assessing dynamic flexibility for a virtual power plant as claimed in claim 13, characterized in that a constraint parameter solution algorithm process of the equivalent energy storage device is:
   a. initializing: allowing K=0;
   b. solving the major problem, thereby obtaining an optimal solution $b^*_E$;
   c. based on the optimal solution $b^*_E$, solving an equivalence problem of the minor problem, thereby obtaining an optimal solution $\xi^*_{K+1}$ and a target function value $f^*_E$;
   d. if $f^*_E$<1×10$^{-6}$ meets, ending algorithm with $b^*_E$ as a final solution result; otherwise, adding following constraint condition to the major problem and allowing K←K+1, and returning to the step b;

$$A_E\xi^*_{K+1} \ge b_E - M(1-z_{K+1}) \tag{73}$$

$$1^T z_{K+1} \ge 1 \tag{74}$$

$$z_{K+1} \in \{0, 1\}^{n_z} \tag{75}$$

$\xi^*_{K+1}$ denotes a constant vector added to a major problem iterated for the K+1 time with a value thereof as an optimal solution of a previous iteration; and $z_{K+1}$ denotes a variable consisting of a 0/1 decision vector in iteration process of the K+1 time.

15. The method of assessing dynamic flexibility for a virtual power plant as claimed in claim 1, characterized in that a constraint parameter for an equivalent generator in the step D is divided into a major problem and a minor problem to be solved,
the major problem is reflected as the following forms:

$$\max_{b_G} u_G^T b_G \tag{76}$$

$$\text{s.t. } A_G\xi^*_k \ge b_G - M(1-z_k), \forall k \le K \tag{77}$$

$$1^T z_k \ge 1, \forall k \le K \tag{78}$$

$$z_k \in \{0, 1\}^{n_z}, \forall k \le K \tag{79}$$

wherein matrix $A_G$ is a constant matrix denoting upper and lower limits of an output power of an equivalent generator and a constraint parameter of upper and lower climbing limits; vector $b_G$ denotes an intercept of each high-dimension hyperplane for a polyhedron of a flexible and feasible region; vector $u_G$ denotes a constant matrix of sum of distances for a parallel plane of a flexible and feasible region; K denotes a total number of scenes; $\xi^*_k$ denotes a constant vector added to a major problem iterated for the K+1 time, with a value thereof being an optimal solution of a previous iteration; $z_k$ denotes a vector of a $k^{th}$ scene consisting of a 0/1 decision variable; $n_z$ denotes a dimensional number of $z_k$, and M denotes a very big constant with a value thereof generally being 1×10$^6$;

the minor problem is reflected as the following forms:

$$\min_{\xi} \max_{x_G} 0 \tag{80}$$

$$\text{s.t. } A_G x_G \le b_G^* \tag{81}$$

$$\xi = C_G x_G + d_G \tag{82}$$

$$E_G x_G \le f_G \tag{83}$$

wherein $b^*_G$ denotes a result obtained by optimization of the major problem; matrix $C_G$ and vector $d_G$ are a constant matrix denoting a relationship between a decision variable $x_G$ of an equivalent generator and an active power output track ξ; and matrix $E_G$ and vector $f_G$ are parameters obtained by solving the Robust optimization problem in formula (59); to facilitate solution, antithetic and KKT conditions are used successively to convert the minor problem into a mixed integer planning problem shown by in formula (84):

$$\min_{\xi,\pi,\lambda,\omega,s} f_G = \lambda^T f_G - \pi^T d_G - \omega^T b_G^* \tag{84}$$

$$\text{s.t. } C_G^T \pi + E_G^T \lambda = 0$$

$$A_G^T \omega + \pi \ge 0$$

$$0 \le b_G^* - A_G\xi \le M(1-s)$$

$$0 \le \omega \le Ms$$

$$s \in \{0, 1\}^{n_s}$$

$$\lambda \ge 0$$

wherein s denotes a vector consisting of a 0/1 decision variable; $n_s$ denotes a dimensional number of s; ω denotes an antithetic variable of constraint (81); π denotes am antithetic variable of constraint (82); and λ denotes an antithetic variable of constraint (83).

16. The method of assessing dynamic flexibility for a virtual power plant as claimed in claim 15, characterized in that a constraint parameter solution algorithm process of the equivalent generator device is as follows:
   a. initializing: allowing K=0;
   b. solving the major problem, thereby obtaining an optimal solution $b^*_G$;
   c. based on the optimal solution $b^*_G$, solving an equivalence problem of the minor problem, thereby obtaining an optimal solution $\xi^*_{K+1}$ and a target function value $f^*_G$;
   d. if $f^*_G$<1×10$^{-6}$ meets, ending algorithm with $b^*_G$ as a final solution result; otherwise, adding following constraint condition to the major problem and allowing K←K+1, and returning to the step b;

$$A_G\xi^*_{K+1} \ge b_G - M(1-z_{K+1}) \tag{85}$$

$$1^T z_{K+1} \ge 1 \tag{86}$$

$$z_{K+1} \in \{0, 1\}^{n_z} \tag{87}$$

$\xi^*_{K+1}$ denotes a constant vector added to a major problem iterated for the K+1 time with a value thereof as an optimal solution of a previous iteration; and $z_{K+1}$ denotes a variable consisting of a 0/1 decision vector in iteration process of the K+1 time.

17. The method of assessing dynamic flexibility for a virtual power plant as claimed in claim 1, characterized in that in the step E, a virtual power plant is equaled to an equivalent energy-storage-type device and an equivalent generator-type device, and based on a result of the step D, flexibility ranges of the equivalent energy-storage-type device and the equivalent generator-type device are respectively shown in formula (88) and formula (89);

$$A_E P_{ESS} \leq b^*_E \qquad (88)$$

$$A_G P_{GEN} \leq b^*_G \qquad (89)$$

wherein matrix $A_E$ is a constant matrix denoting upper and lower limits of an output power of A equivalent energy storage and a constraint parameter of upper and lower energy limits of energy storage; matrix $A_G$ is a constant matrix denoting upper and lower limits of an output power of an equivalent generator and a constraint parameter of upper and lower climbing limits; $b^*_E$ denotes a result obtained by optimizing the major problem of a constraint parameter of an equivalent energy storage device; $b^*_G$ denotes a result obtained by optimizing the major problem of a constraint parameter of an equivalent generator, $P_{ESS}$ denotes a vector consisting of an output active power of equivalent energy-storage-type devices at each moment; and $P_{GEN}$ denotes a vector consisting of an output active power of equivalent generator-type devices at each moment;

an output active power of the virtual power plant is shown in formula (90):

$$P_{VPP} = P_{ESS} + P_{GEN} \qquad (90)$$

$P_{VPP}$ denotes a vector consisting an output active power of a virtual power plant at each moment.

* * * * *